(12) United States Patent
Watanabe et al.

(10) Patent No.: US 8,921,006 B2
(45) Date of Patent: Dec. 30, 2014

(54) FUEL CELL ASSEMBLY AND FUEL CELL DEVICE WITH CURRENT COLLECTOR BETWEEN FUEL CELLS

(75) Inventors: Naoki Watanabe, Kitakyushu (JP); Yousuke Akagi, Kitakyushu (JP); Shuichiro Saigan, Kitakyushu (JP); Nobuo Isaka, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 600 days.

(21) Appl. No.: 13/262,008

(22) PCT Filed: Mar. 31, 2010

(86) PCT No.: PCT/JP2010/055917
§ 371 (c)(1),
(2), (4) Date: Sep. 29, 2011

(87) PCT Pub. No.: WO2010/114050
PCT Pub. Date: Oct. 7, 2010

(65) Prior Publication Data
US 2012/0021327 A1    Jan. 26, 2012

(30) Foreign Application Priority Data
Mar. 31, 2009  (JP) .................................. 2009-087053

(51) Int. Cl.
*H01M 4/64*  (2006.01)
*H01M 8/12*  (2006.01)
*H01M 8/02*  (2006.01)
*H01M 8/24*  (2006.01)

(52) U.S. Cl.
CPC .......... *H01M 8/1206* (2013.01); *H01M 8/0252* (2013.01); *H01M 8/0202* (2013.01); *H01M 8/0247* (2013.01); *H01M 8/025* (2013.01); *H01M 8/241* (2013.01); *H01M 2008/1293* (2013.01); *Y02E 60/521* (2013.01); *Y02E 60/525* (2013.01)

USPC .......................... 429/517; 429/452; 429/518

(58) Field of Classification Search
CPC ............ H01M 8/0202; H01M 8/0247; H01M 8/0252; H01M 8/025; H01M 2008/1293
USPC ......................................... 429/517, 452, 518
See application file for complete search history.

(56) References Cited

U.S. PATENT DOCUMENTS

| | | | |
|---|---|---|---|
| 2007/0099065 A1* | 5/2007 | Rawson et al. | 429/40 |
| 2009/0081516 A1 | 3/2009 | Watanabe et al. | |
| 2012/0094217 A1 | 4/2012 | Watanabe et al. | |

FOREIGN PATENT DOCUMENTS

| | | |
|---|---|---|
| JP | 09-274927 A | 10/1997 |
| JP | 2002-289249 A | 10/2002 |

(Continued)

OTHER PUBLICATIONS

Written Opinion of the International Searching Authority for International Application No. PCT/JP2010/055917, dated Jun. 8, 2010, 6 pages.

(Continued)

*Primary Examiner* — Zachary Best
(74) *Attorney, Agent, or Firm* — Brinks Gilson & Lione

(57) ABSTRACT

The fuel cell assembly of the present invention comprises a first fuel cell, a second fuel cell disposed adjacent to the first fuel cell, and a current collector for electrically connecting the first fuel cell and the second fuel cell. The first fuel cell and the second fuel cell are respectively furnished with an electrical generating portion for generating electricity, each of the electrical generation portion having a first electrode through the interior of which a first gas flows, a second electrode of a polarity different from the first electrode, on the exterior of which a second gas flows, and an electrolyte disposed between the first electrode and the second electrode. The current collector distributes and sources the current generated in the first fuel cell generating portion from two different locations on the first electrode on the first fuel cell to the second electrode of the second fuel cell.

10 Claims, 22 Drawing Sheets

(56) References Cited

FOREIGN PATENT DOCUMENTS

| JP | 2005-166552 A | | 6/2005 |
|----|---------------|---|--------|
| JP | 2006-004741 A | | 1/2006 |
| JP | 2006-100091 A | | 4/2006 |
| JP | 2006100091 A | * | 4/2006 |
| JP | 2008-071712 A | | 3/2008 |
| JP | 2009-004221 A | | 1/2009 |
| JP | 2010-055862 A | | 3/2010 |
| WO | WO 2008/032773 A1 | | 3/2008 |

OTHER PUBLICATIONS

International Preliminary Report on Patentability for International Application No. PCT/JP2010/055917, dated Nov. 15, 2011, 7 pages.
International Search Report for International Application No. PCT/JP2010/055917, dated Jun. 8, 2010, 2 pages.

* cited by examiner

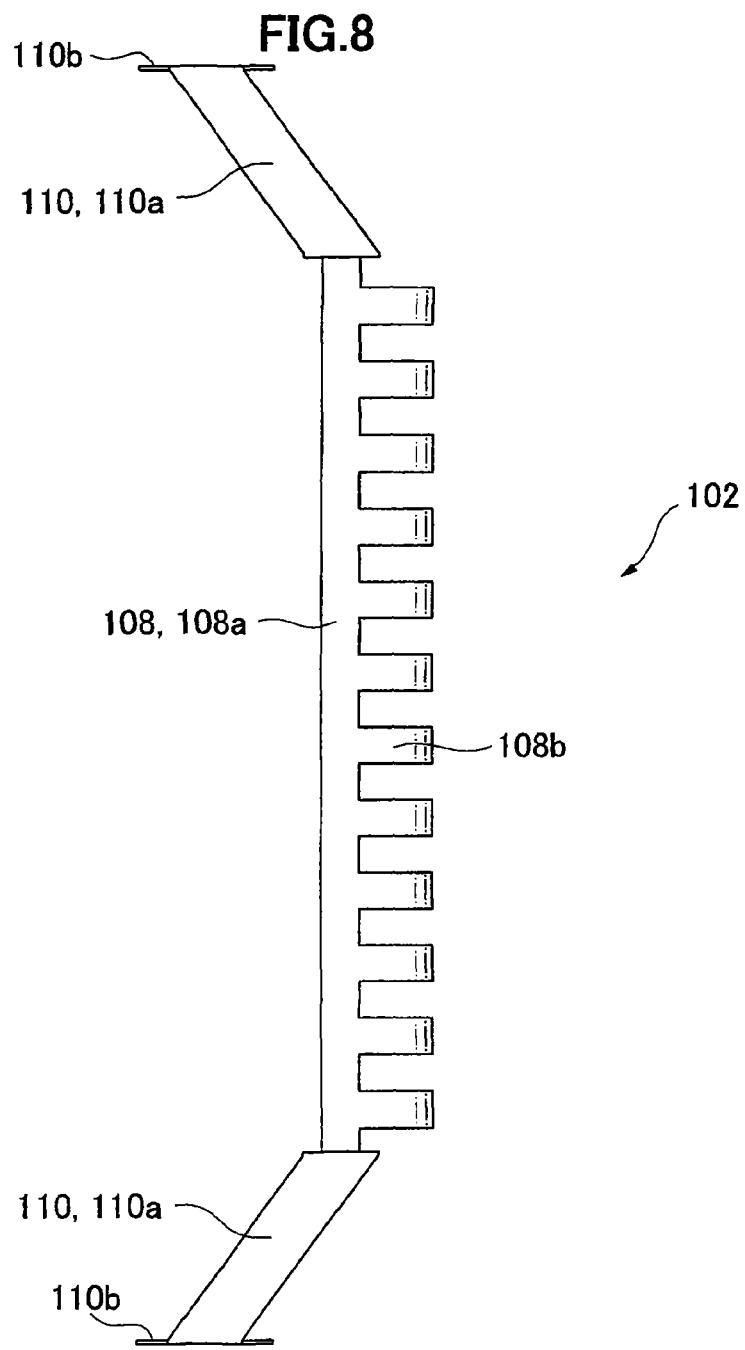
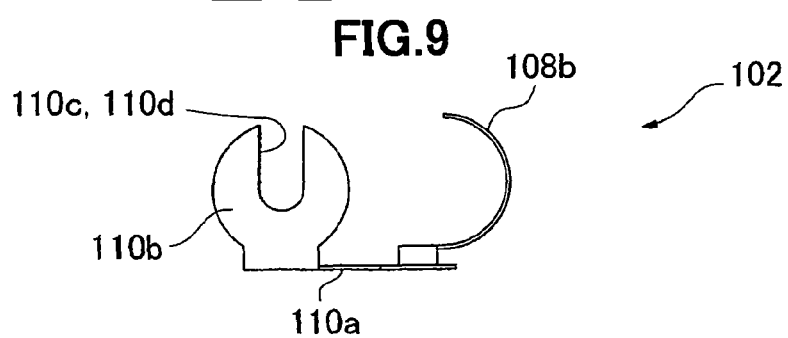

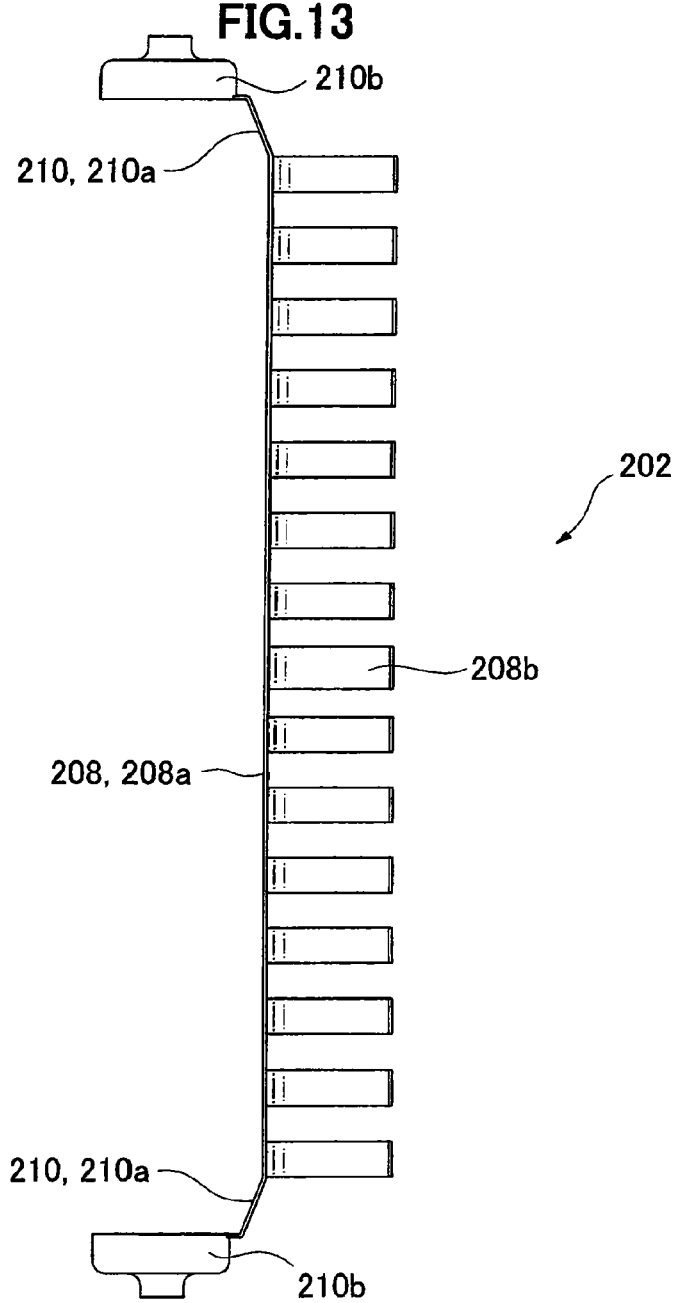
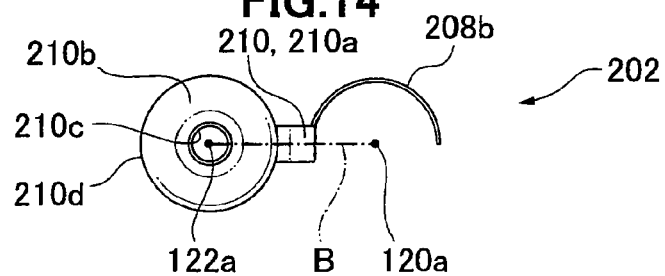

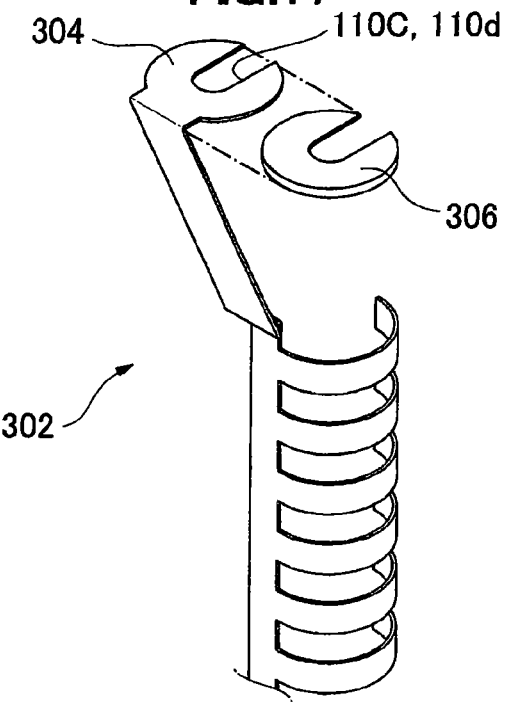
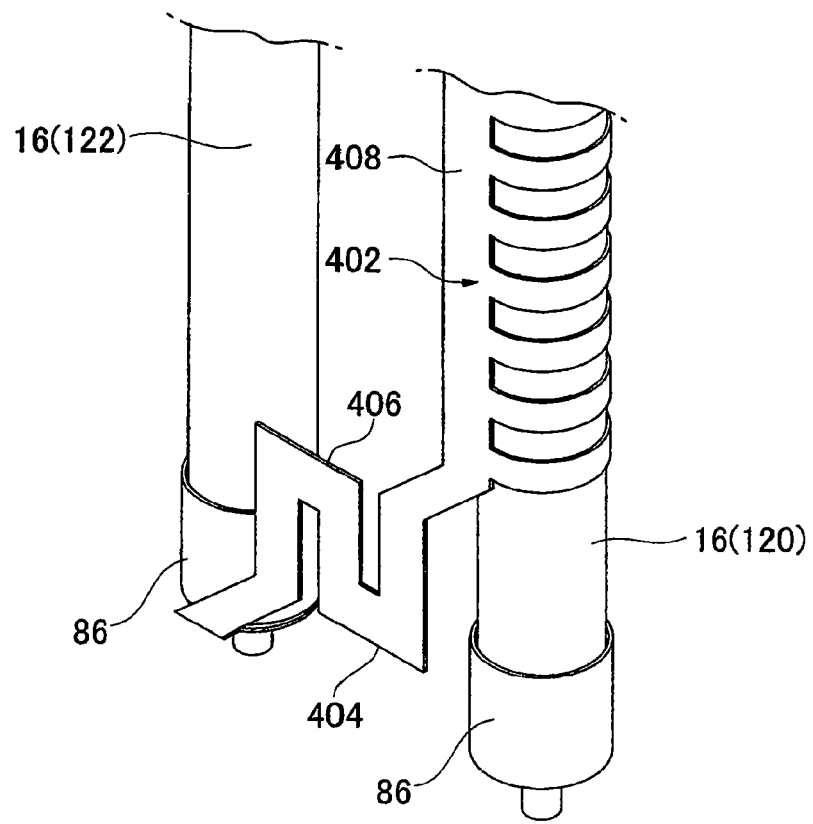

FUEL CELL ASSEMBLY AND FUEL CELL DEVICE WITH CURRENT COLLECTOR BETWEEN FUEL CELLS

This application is a 371 application of PCT/JP2010/055917 having an international filing date of Mar. 31, 2010, which claims priority to JP 2009-087053 filed on Mar. 31, 2009, the entire contents of which are incorporated herein by reference.

TECHNICAL FIELD

The present invention relates to a fuel cell assembly and a fuel cell device.

BACKGROUND ART

A solid oxide fuel cell device ("SOFC" below) is a fuel cell device for generating electricity by causing an electrical generating reaction to take place at a relatively high temperature by use of an oxide ion electrically conductive solid electrolyte as an electrolyte, with electrodes attached on both sides thereof, and with fuel gas supplied to one side thereof and air supplied to the other side thereof.

In fuel cell device of this type, the amount of electrical power obtained from a single fuel cell (single cell) is small, therefore the required electrical power is obtained by arraying multiple fuel cells in parallel and connecting these in an electrically serial form using a current collecting member, as shown in Patent Citations 1-3.

Patent Document 1 discloses, an air electrode (+ pole) is formed on the inner circumferential surface of an electrolyte formed in a cylindrical shape, and a fuel electrode (− pole) is formed on the outer circumferential surface thereof and the air electrode on the inner circumferential surface is extended cylindrically from solid electrode at its end. In the fuel cell of this Patent Document 1, multiple fuel cells (single cells) are arrayed in parallel inside a housing, and the open portion of the housing is hermetically sealed so that fuel gas supplied to the interior of the housing does not leak out. A current collector is attached to the outer circumferential surface of each single cell; the end portion of this current collector extends airtightly from the glass on one side of the air electrode and is connected to the air electrode in the adjacent single cell via a connecting current collecting member. In the fuel cell of Patent Citation 1, a solid oxide fuel cell is formed by thus serially connecting multiple single cells in a stack.

Patent Document 2 discloses a fuel cell (single cell) in which a fuel electrode (− pole) is formed on the inner circumferential surface of a solid electrolyte formed in a cylindrical shape and an air electrode (+ pole) is formed on the outer circumferential surface thereof, whereby an inner electrode (− pole) connected to the fuel electrode is formed on one end, and an outer electrode (+ pole) connected to the air electrode is formed at the other end thereof. In the solid oxide fuel cell of Patent Document 2, all of the 20 single cells, consisting of 5×4 rows, are serially connected. Specifically, multiple single cells are oriented in alternately opposite directions, and both end portions of the multiple single cells are positioned by support plates at both end portions thereof, with the inside electrode (− pole) and the outside electrode (+ pole) respectively serially connected at the respective support plate sides.

Patent Document 3 also discloses approximately the same type of fuel cell as Patent Document 2.

PRIOR ART DOCUMENTS

Patent Documents

Patent Document 1: JP-A-9-274927
Patent Document 2: JP-A-2008-71712
Patent Document 2: JP-A-2002-289249

SUMMARY OF THE INVENTION

As explained above, current collectors are used to electrically serially connect single cells to adjacent single cells; however these current collectors are subject to a number of problems and need improvements. For example, in the Patent Document 1 case, the current collector attached to the outer circumferential surface of each single cell is airtightly extended from the glass used to seal the housing and is connected to the air electrode of the adjacent single cell via a connecting current collecting member, but this leads to a complex structure, and stability, etc. is poor when electrically connecting and assembling multiple single cells. In the Patent Document 2 and 3 cases, because a fuel electrode (− pole) is formed at one end portion of the single cell and an air electrode (+ pole) is formed at the other end thereof, there is a long movement path over which electrons in the electrodes must move from one end to the other end; this is a cause of increased electrical resistance and reduced fuel cell electrical generation efficiency.

It is therefore an object of the present invention to provide a fuel cell assembly and a fuel cell device capable of improving electrical generating efficiency.

The above object is achieved according to the present invention by providing a fuel cell assembly comprising a first fuel cell, a second fuel cell disposed adjacent to the first fuel cell, and a current collector for electrically connecting these first fuel cell and the second fuel cell, wherein the first fuel cell and second fuel cell are respectively furnished with an electrical generating portion for generating electricity, each of the electrical generation portion having a first electrode through the interior of which a first gas flows, a second electrode of a polarity different from the first electrode, on the exterior of which a second gas flows, and an electrolyte disposed between the first electrode and the second electrode, wherein the current collector distributes and sources the current generated in the electrical generating portion of the first fuel cell from two different locations on the first electrode on the first fuel cell to the second electrode of the second fuel cell.

According to the present invention thus constituted, the current collector for electrically connecting the first fuel cell and the second fuel cell adjacent thereto distributes and sources current generated in the first fuel cell generating portion from two different locations on the first electrode on the first fuel cell to the second fuel cell second electrode. Therefore the numerical value of the current flowing to the current collector is small, thus reducing electrical resistance. Furthermore, in the first fuel cell first electrode current moves to the closer of the two locations, therefore the electron movement path in the first electrode is shortened, which reduces electrical resistance. As a result, the present invention enables an improvement in the electrical generating efficiency of the fuel cell current collector.

In preferred embodiment of the present invention, the first fuel cell and second fuel cell are respectively furnished with second electrodes at both ends, and the current collectors comprise a first current collector for distributing and sourcing current generated in the electrical generating portion of the first fuel cell from the first location on the first electrode of the first fuel cell to the second electrode at one end of the second fuel cell, and a second current collector for distributing and sourcing current from a second location on the first electrode of the first fuel cell to the second electrode at the other end of the second fuel cell, wherein the first current collector and second current collector are electrically independent.

According to the present invention thus constituted, the first fuel cell and the second fuel cell are respectively provided with the second electrode at both ends, and since current generated in the electrical generating portion of the first fuel cell is distributed and sourced to both ends of the second fuel cell by the electrically independent first current collector and second current collector, current will flow on one current path (one current collector) even if some malfunction prevents current from flowing on the other current path (the other current collector), thus allowing a current path to be easily secured.

In another preferred embodiment of the present invention, the first current collector and the second current collector are respectively disposed to be mutually separate in the exterior portion of the first fuel cell, and are mechanical current collectors with a predetermined rigidity required to support the first fuel cell and the second fuel cell.

According to the present invention thus constituted, because the first current collector and the second current collector are mutually separated mechanical current collectors, a current path can be easily secured on one current collector even if a malfunction arises in the other current collector so that current ceases to flow. Moreover, the mechanical current collectors have a predetermined rigidity required to support the first fuel cell and the second fuel cell, and support the first fuel cell and the second fuel cell at multiple locations, therefore the support rigidity and stability of the first fuel cell and the second fuel cell are improved, which greatly increases the rigidity of the fuel cell assembly and produces a stable structure.

In still another of the present invention, the first current collector and the second current collector are disposed at a distance from one another along the direction in which the first gas and the second gas flow on the exterior of the first fuel cell.

According to the present invention thus constituted, the first current collector and the second current collector are disposed at a distance from one another along the direction in which fuel gas flows on the exterior of the first fuel cell, thereby shortening the movement distance within the first electrode on the exterior of the first fuel cell over which the large current is generated on the upstream side of either the first or second fuel gases, which reduces electrical resistance.

In another embodiment of the present invention, the first current collector and second current collector are disposed to be mutually separated in the longitudinal direction from the center on the exterior of the first fuel cell.

According to the present invention thus constituted, the first current collector and the second current collector are disposed to be mutually separated in the longitudinal direction from the center on the exterior of the first fuel cell, therefore current arising in the region separated in the longitudinal direction from the center of the first electrode on the exterior of the first fuel cell flows to the nearer current collector, thus enabling the distance over which current moves in the first electrode of the first fuel cell exterior to be shortened, which results in reduced electrical resistance.

In another embodiment of the present invention, the first current collector and the second current collector are disposed at the two end portions most separated in the longitudinal direction from the center on the exterior of the first fuel cell.

According to the present invention thus constituted, the first current collector and the second current collector are disposed at the two end portions most separated in the longitudinal direction from the center on the exterior of the first fuel cell, thus shortening the distance between the connecting portion between the first electrodes of the first fuel cell on the first current collector and the second current collector, and the connecting portion with the second electrodes at both ends of the second fuel cell, in turn shortening the current movement path in the current collectors, which results in lowered electrical resistance in the first current collector and the second current collector.

In another embodiment of the present invention, the first current collector and the second current collector are respectively furnished with sloped portions sloping from the two end portions on the exterior of the first fuel cell in the direction of the second electrode at both ends of the second fuel cell.

According to the present invention thus constituted, the first current collector and the second current collector are respectively furnished with sloped portions sloping from the two end portions on the exterior of the first fuel cell in the direction of the second electrode at both ends of the second fuel cell, thus enabling the first fuel cell and second fuel cell to be connected over a short distance, thereby reducing electrical resistance.

In another embodiment of the present invention, the first current collector and the second current collector are respectively furnished with step portions capable of easy elastic deformation.

According to the present invention thus constituted, the first current collector and the second current collector are respectively furnished with easily elastically deformable step portions, therefore variations in the length and width directions in the first and second fuel cells can be absorbed by the elastic deformation of this step portion.

In another embodiment of the present invention, the sloped portions of the first current collector and the second current collector are respectively provided with a convex radiused portion facing the center in the longitudinal direction of the first fuel cell.

According to the present invention thus constituted, the sloped portions of the first current collector and the second current collector are respectively provided with a convex radiused portion facing the center in the longitudinal direction of the first fuel cell, therefore the first fuel cell first electrode and the second electrodes at both ends of the second fuel cell can be connected over a short distance while avoiding shorting through contact between the second electrodes at both ends of the first fuel cell itself. As a result, the pitch separating distance at which the fuel cells are arrayed can be narrowed.

In another embodiment of the present invention, the sloped portions of the first current collector and the second current collector are provided so that when seen in top view, the sloped portions are connected at a minimum distance along a line connecting the center of the first fuel cell and the center of the second fuel cell.

According to the present invention thus constituted, the sloped portions of the first current collector and the second current collector are provided so that when seen in top view, the sloped portions are connected at the minimum distance along a line connecting the center of the first fuel cell and the center of the second fuel cell, therefore electrical resistance is reduced.

In another embodiment of the present invention, the first current collector and the second current collector are respectively furnished with a cap portion in contact with at least a part of the second electrodes at the ends of the second fuel cell.

According to the present invention thus constituted, the first current collector and the second current collector are respectively furnished with a cap portion in contact with at least a part of the second electrodes at the ends of the second fuel cell, therefore the first current collector and the second current collector can be stably attached to the second electrodes at the end portions of the second fuel cell.

In another embodiment of the present invention, the first current collector and the second current collector are respectively furnished with a crimping surface portion for crimping the second electrodes at the end portions of the second fuel cell from the top and bottom directions.

According to the present invention thus constituted, the first current collector and the second current collector are respectively furnished with a crimping surface portion for crimping the second electrodes at the end portions of the second fuel cell from the top and bottom directions, therefore assembly stability of the fuel cell assembly is improved, also, the first current collector and the second current collector make surface contact with the second electrode at the end portion of the fuel cell, which increases the contact surface area, thereby reducing contact resistance between the first current collector and the second electrode of the second fuel cell.

In another embodiment of the present invention, the crimping surface portions of the first current collector and the second current collector are respectively furnished with variation absorbing portions.

According to the present invention thus constituted, variations in the longitudinal direction of the fuel cell can be absorbed using the variation absorbing portions.

In another embodiment of the present invention, the second fuel cell is furnished with cylindrical parts at both end portions, and the crimping surface portion of the first current collector and the second current collector are open in one portion to furnish an engaging portion having with a long hole for receiving the cylindrical parts.

According to the present invention thus constituted, when the crimping surface portions of the first current collector and the second current collector are attached to the second fuel cell, the first current collector and the second current collector can be assembled to the second fuel cell by simply bringing the crimping surface portion into contact with the two end portions of the second fuel cell and inserting and sliding the cylindrical parts.

In another embodiment of the present invention, the first current collector and the second current collector are respectively furnished with relief portions for relieving the concentration of stress in the area proximate to the part contacting the first electrode of the first fuel cell.

According to the present invention thus constituted, the provision of relief portions means that even if a force acts upon the first current collector and second current collector, concentration of stress occurring in the area proximate to the contacting part of the first current collector and the second current collector with the first electrode of the first fuel cell is relieved.

In another embodiment of the present invention, the first current collector and the second current collector are electrically connected at the center exterior perimeter portion along the longitudinal direction of the first fuel cell.

According to the present invention thus constituted, the first current collector and the second current collector are electrically connected at the center exterior perimeter portion along the longitudinal direction of the first fuel cell, therefore current flows between the two end portions of the second fuel cell adjacent to the first fuel cell and the center exterior perimeter portion of the first fuel cell, so the distance over which current flows is shortened and electrical resistance is reduced. Furthermore, current passes through a relatively low resistance current collector at the center exterior perimeter portion of the first fuel cell, so that current collector losses due to electrical resistance are reduced.

In another embodiment of the present invention, the fuel cell assembly further comprises a porous, electrically conductive current collector film provided on the outside of the first electrode of the first fuel cell, the first current collector and the second current collector being electrically connected to the current collector film.

According to the present invention thus constituted, the fuel cell further comprises a porous current collector film provided on the outside of the first electrode of the first fuel cell, and the first current collector and the second current collector are electrically connected to the current collector film, therefore it is unnecessary to connect a fine metal current collector, for example, to the first fuel cell first electrode, and the surface area for uptake of the second gas from the first electrode of the first fuel cell increases, furthermore, because the second gas flows along the current collector film, turbulence in the second gas can be reduced, which enables the prevention of insufficient gas uptake by the first fuel cell.

In another embodiment of the present invention, a cutout portion is formed at the respective attachment portions of the first current collector and the second current collector to the first fuel cell and the second fuel cell in such a way as not to mutually contact the attachment portions of other current collectors disposed in the same position along the longitudinal direction of adjacent fuel cells, and to be separated by a predetermined distance from other current collectors.

According to the present invention thus constituted, a cutout portion is formed at the respective attachment portions of the first current collector and the second current collector to the first fuel cell and the second fuel cell in such a way as not to mutually contact the attachment portions of other current collectors disposed in the same position along the longitudinal direction of adjacent fuel cells, and to be separated by a predetermined distance from other current collectors, therefore contact and discharge between adjacent current collectors can be prevented. As a result, the distance between adjacent fuel cells can be shortened, and fuel cell assemblies can be made more compact.

In another embodiment of the present invention, the respective attaching portions of the first fuel cell and the second fuel cell to the first current collector and the second current collector are furnished with a first gripping portion extending in a direction perpendicular to the longitudinal direction of the fuel cell, and a second gripping portion facing the first gripping portion, two protrusions being formed on the first gripping portion for forming cutout portions, and a single protrusion being formed on the second gripping portion at a position corresponding to the position in the longitudinal direction of the first gripping portion on the fuel cell.

According to the present invention thus constituted, the respective attaching portions of the first current collector and the second current collector are respectively furnished with a first gripping portion on which two protrusions are formed, and a second gripping portion on which one protrusion is formed, and the one protrusion on the second gripping portion is formed at a position corresponding to the position of the first gripping portion cutout portion in the longitudinal direction of the fuel cell, therefore contact and discharge between adjacent current collectors can be prevented, and the first current collector and the second current collector can be stably attached to the fuel cell.

The present invention is a fuel cell provided with the above-explained fuel cell assembly.

The fuel cell assembly according to the present invention enables electrical generating efficiency to be improved.

BRIEF DESCRIPTION OF DRAWINGS

FIG. 8 is a front elevation view of the current collector shown in FIG. 7;

FIG. 9 is a plan view of the current collector shown in FIG. 7;

FIG. 13 is a front elevation view of the current collector shown in FIG. 12;

FIG. 14 is a plan view of the current collector shown in FIG. 12;

FIG. 17 is a perspective view showing the upper half of a current collector used in a solid oxide fuel cell device (SOFC) fuel cell stack according to a third embodiment of the present invention;

FIG. 18 is a schematic view showing a portion of the lower half of a fuel cell stack including a current collector according to a first example of a fourth embodiment of the present invention;

DETAILED DESCRIPTION OF THE PREFERRED EMBODIMENTS

Next, referring to the attached drawings, a solid oxide fuel cell device (SOFC) according to an embodiment of the present invention will be explained.

Figure 1:
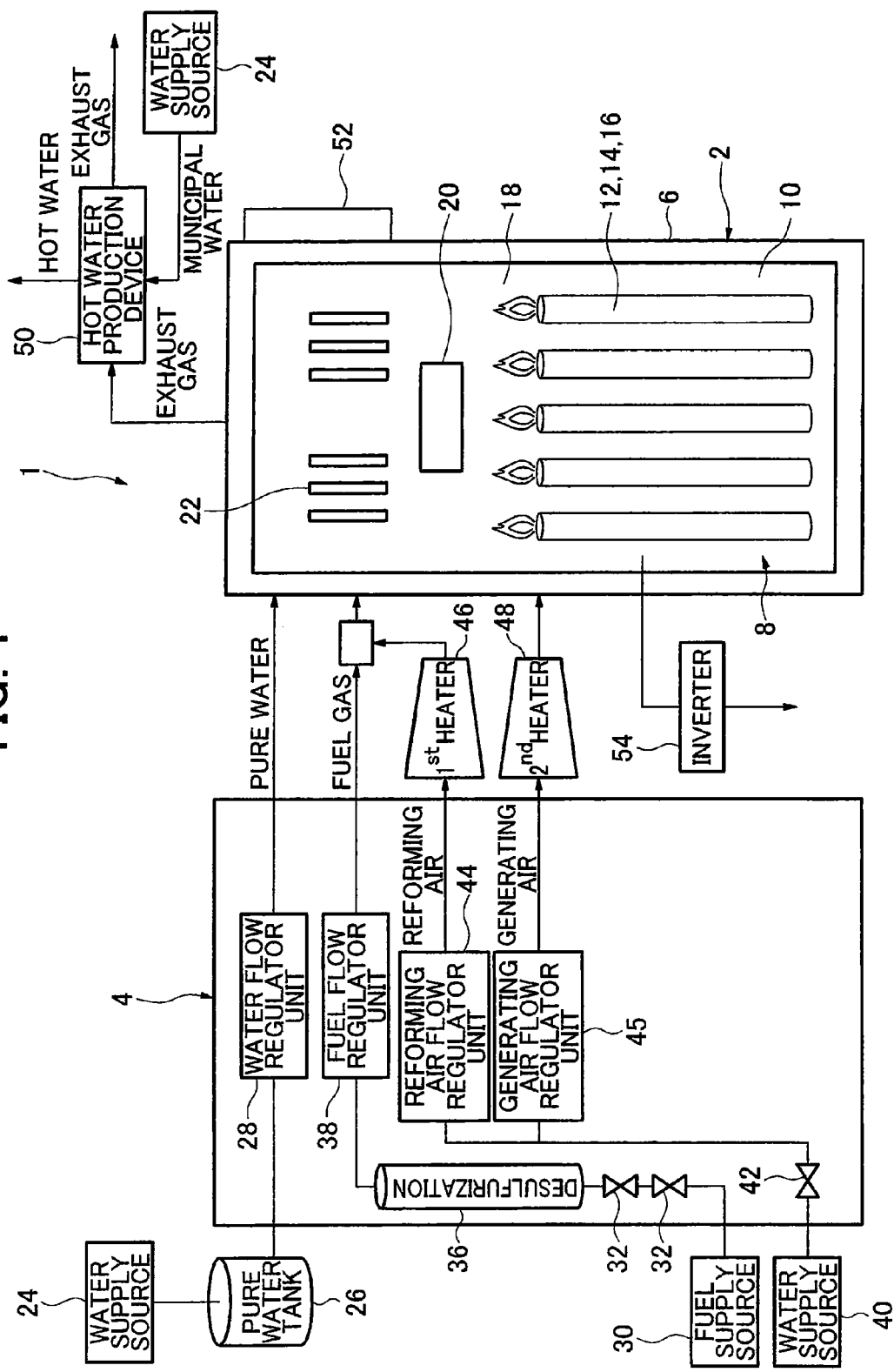
FIG. 1 is an overall schematic view showing a solid oxide fuel cell device (SOFC) according to a first embodiment of the present invention.

As shown in FIG. 1, a solid oxide fuel cell device (SOFC) according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
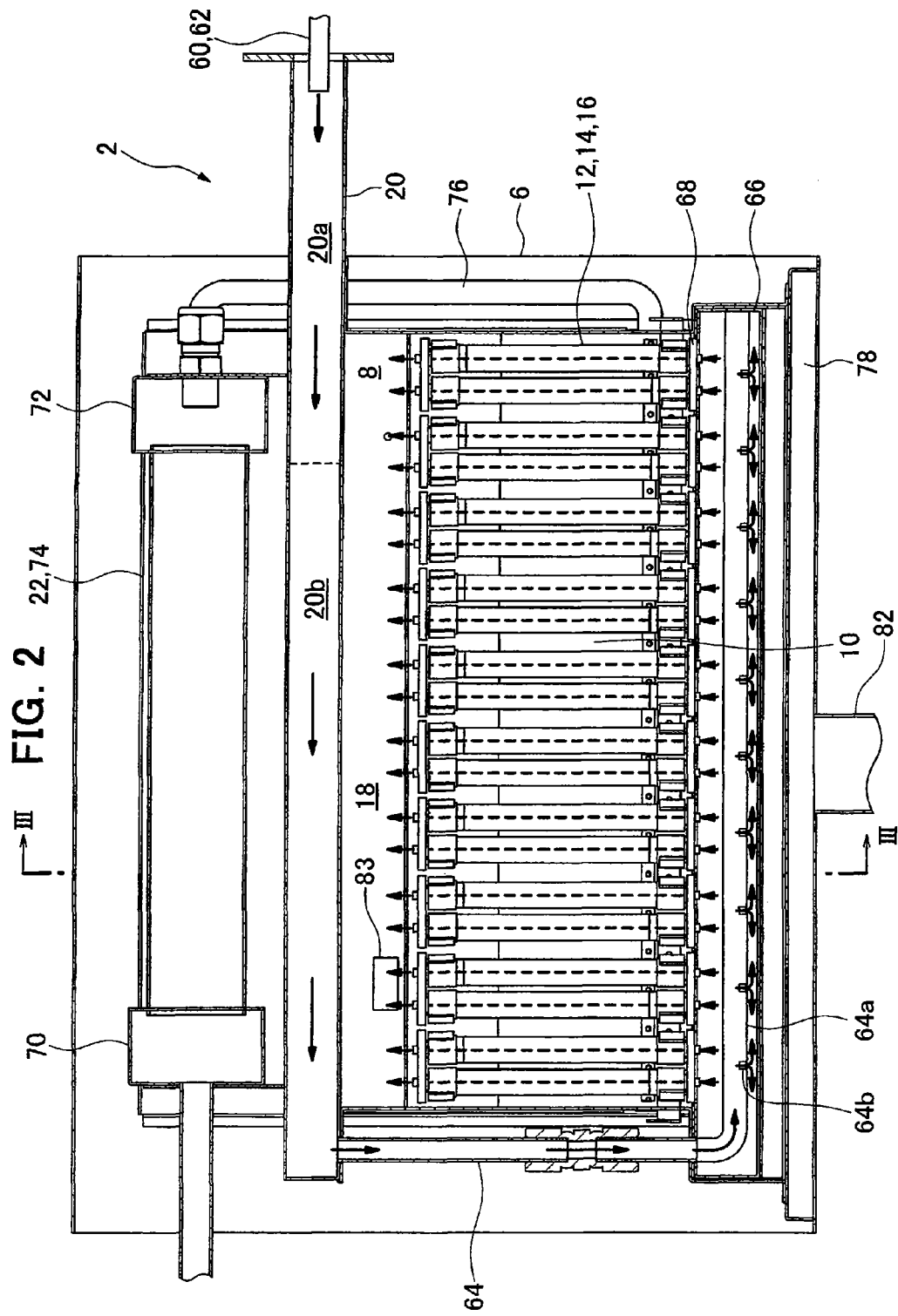
FIG. 2 is a front elevation sectional view showing a solid oxide fuel cell device (SOFC) module according to a first embodiment of the present invention.
Figure 3:
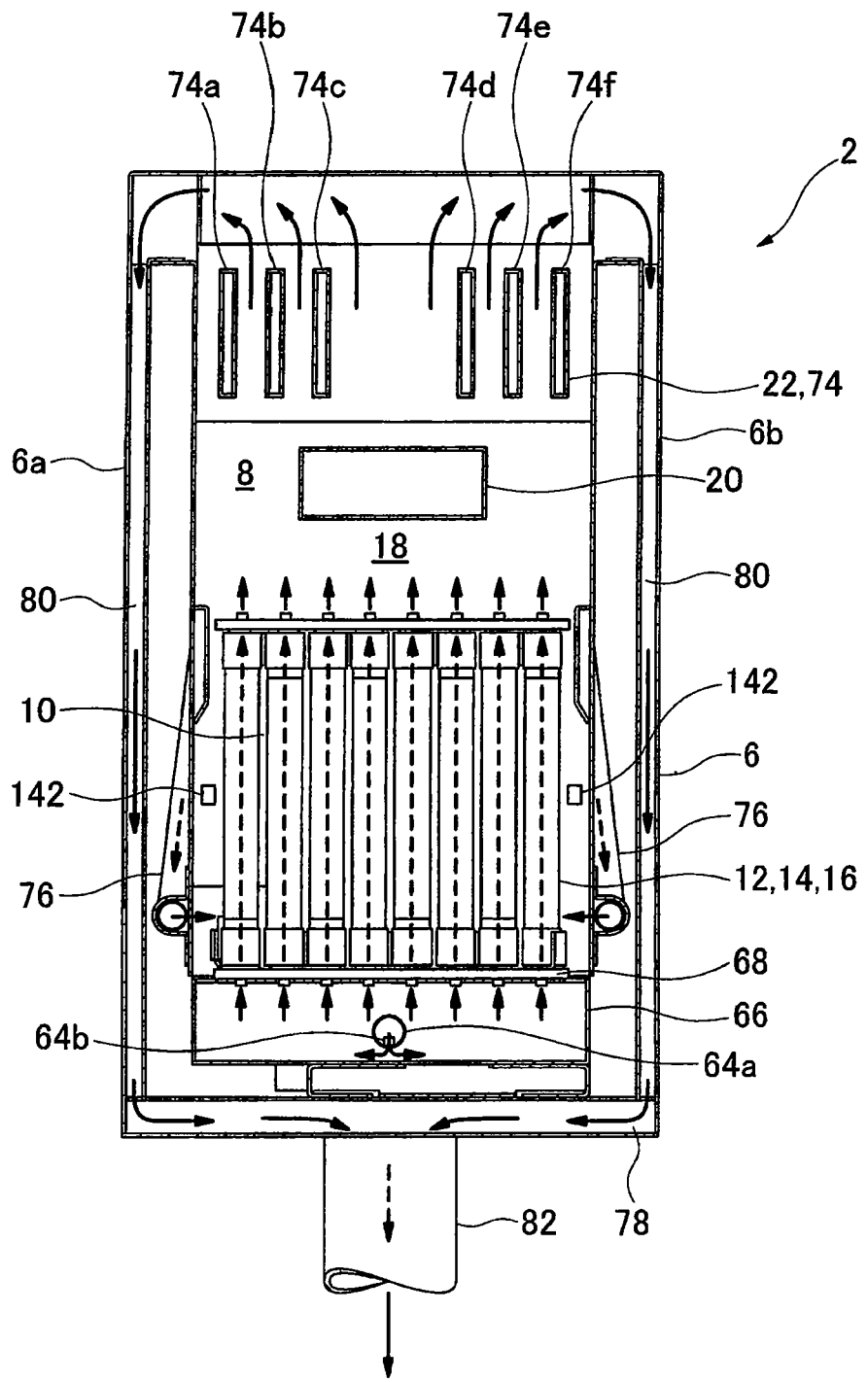
FIG. 3 is a sectional view along line in FIG. 2.

The internal structure of the solid oxide fuel cell device (SOFC) according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
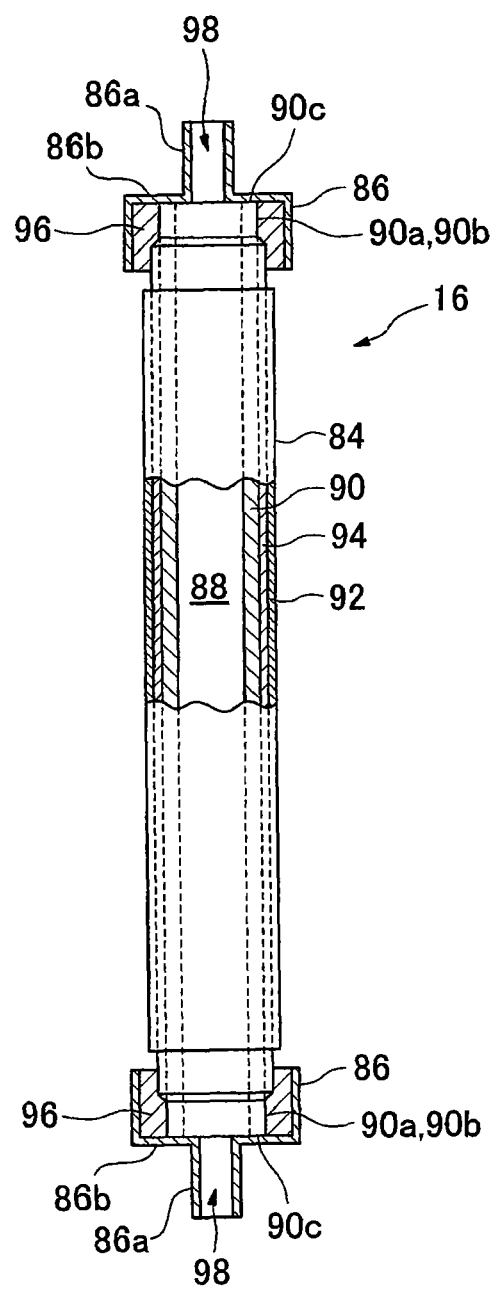
FIG. 4 is a partial sectional view showing a solid oxide fuel cell device (SOFC) fuel cell unit according to a first embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Next, referring to FIGS. 5 and 6, the fuel cell stack 14 and the fuel cell assembly 12 will be explained.

Figure 5:
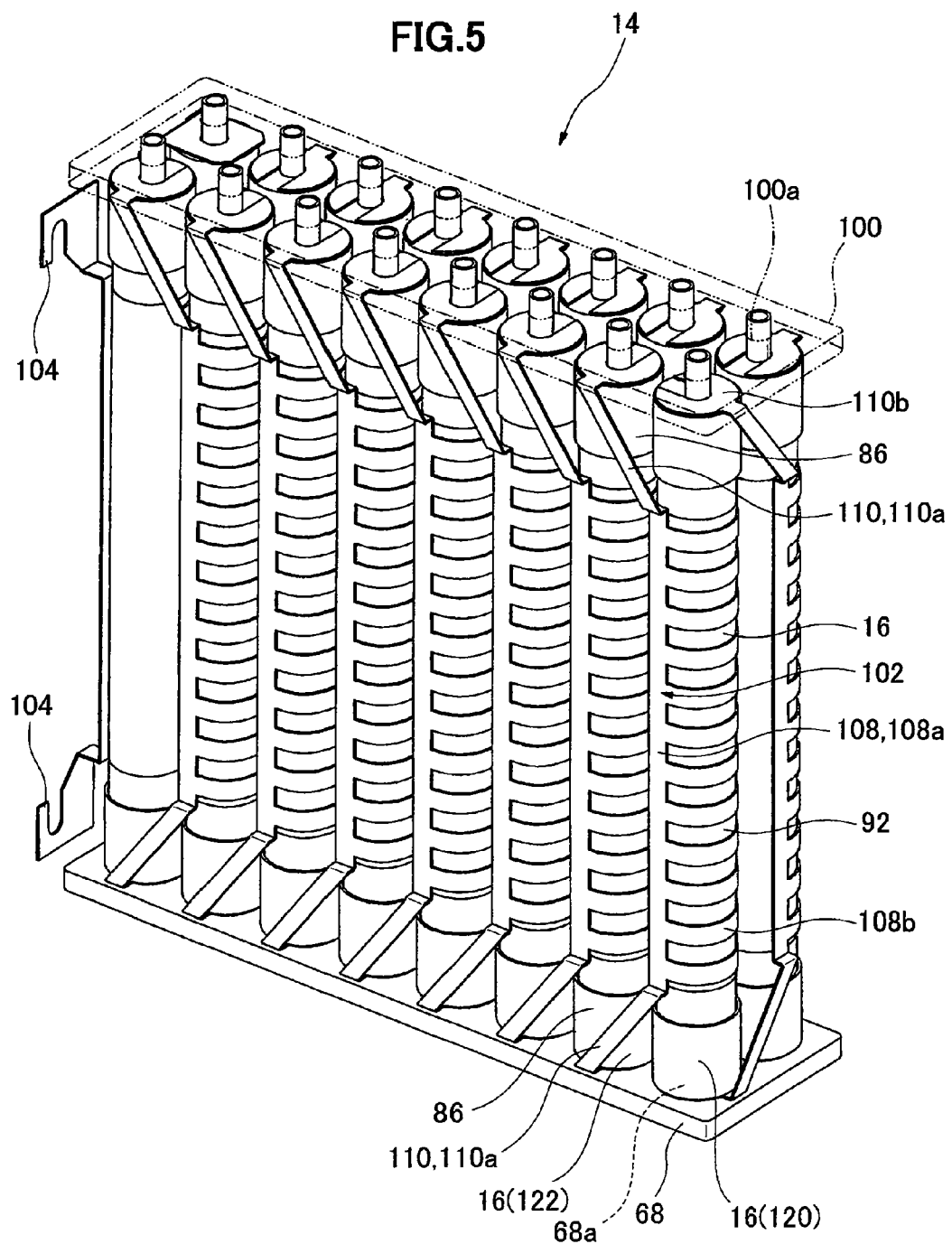
FIG. 5 is a perspective view showing a solid oxide fuel cell device (SOFC) fuel cell stack according to a first embodiment of the present invention.

FIG. 5 is a perspective view showing the fuel cell stack in a solid oxide fuel cell device (SOFC) according to a first embodiment of the present invention; FIG. 6 is a perspective view showing the fuel cell assembly of a solid oxide fuel cell device (SOFC) according to a first embodiment of the present invention.

As shown in FIG. 5, the fuel cell stack 14 is furnished with sixteen fuel cell units 16; the bottom end side and top end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100 respectively.

A metal current collector 102 and an external terminal 104 are attached to the fuel cell unit 16. This current collector 102 is explained in detail below, but has the purpose of electrically connecting the inside electrode terminal 86 and the outside electrode layer 92 at both end portions of the fuel cell unit 16.

Figure 6:
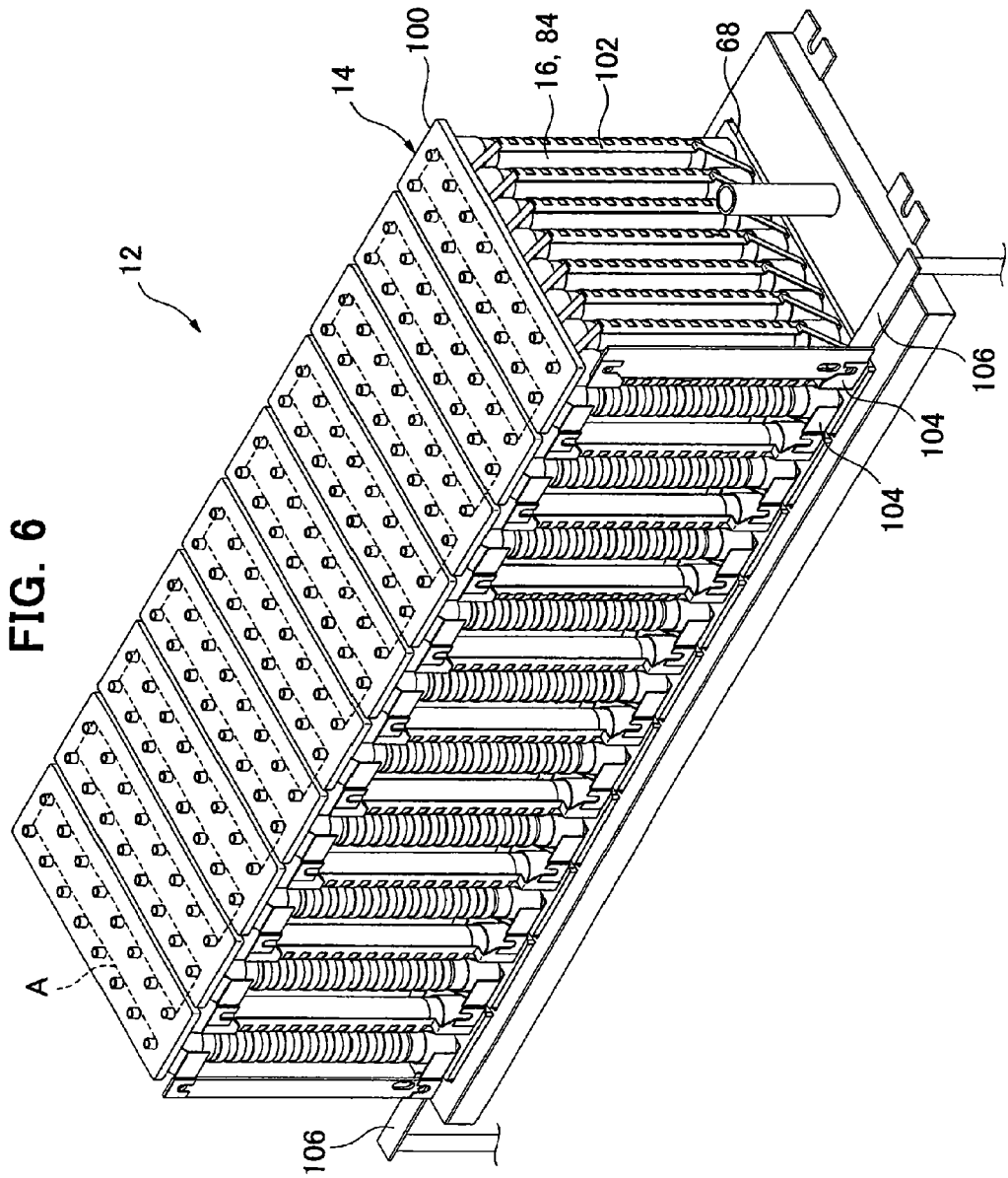
FIG. 6 is a perspective view showing the fuel cell assembly of a solid oxide fuel cell device (SOFC) according to a first embodiment of the present invention.

Furthermore, as shown in FIG. 6, electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) of the fuel cell unit 16 at the ends of the adjacent fuel cell stack 14; ultimately the ten fuel cell stacks 14 are respectively connected, with the result that all 160 fuel cell units 16 are connected in series, thereby forming a fuel cell assembly 12. In this fuel cell unit 12, current flows in the manner shown by dotted line A when viewed in plan view. This generated electrical power is taken out from the output terminal 106 connected to both sides of the fuel cell assembly 12.

Figure 7:
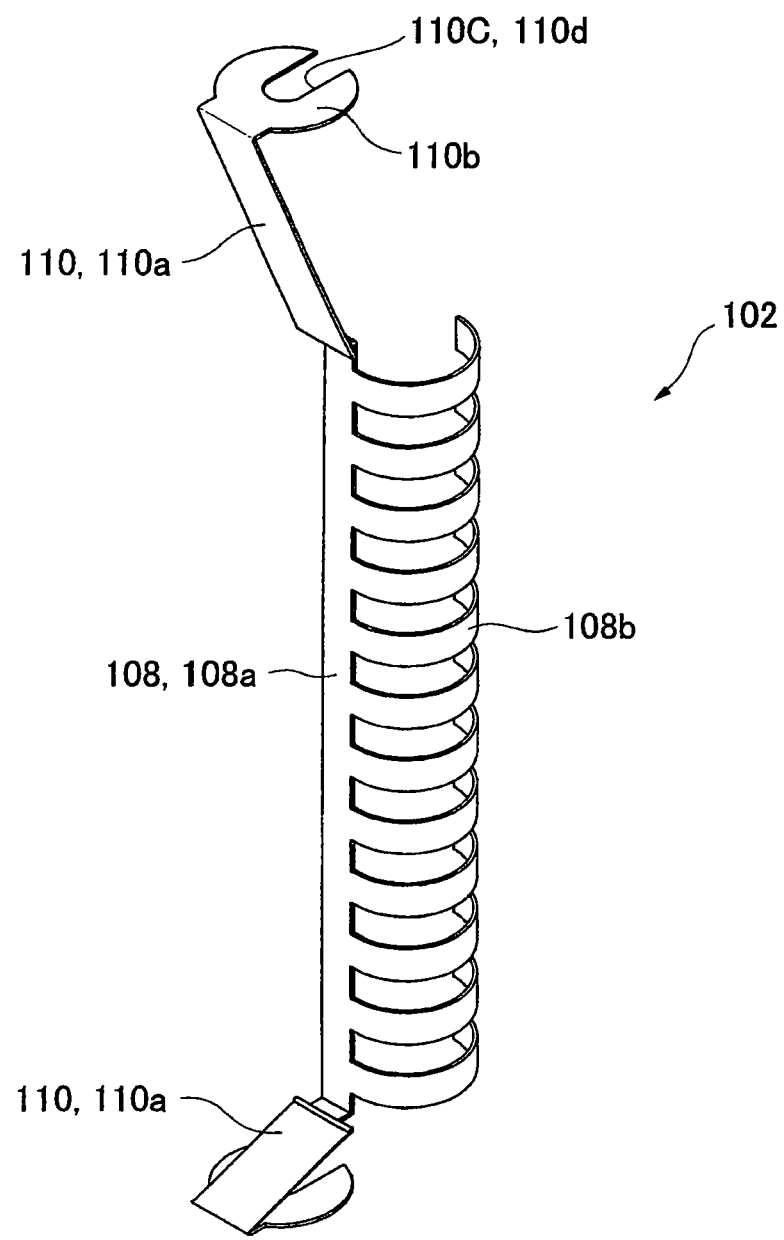
FIG. 7 is a perspective view showing a current collector used in a solid oxide fuel cell device (SOFC) fuel cell stack according to a first embodiment of the present invention.
Figure 10:
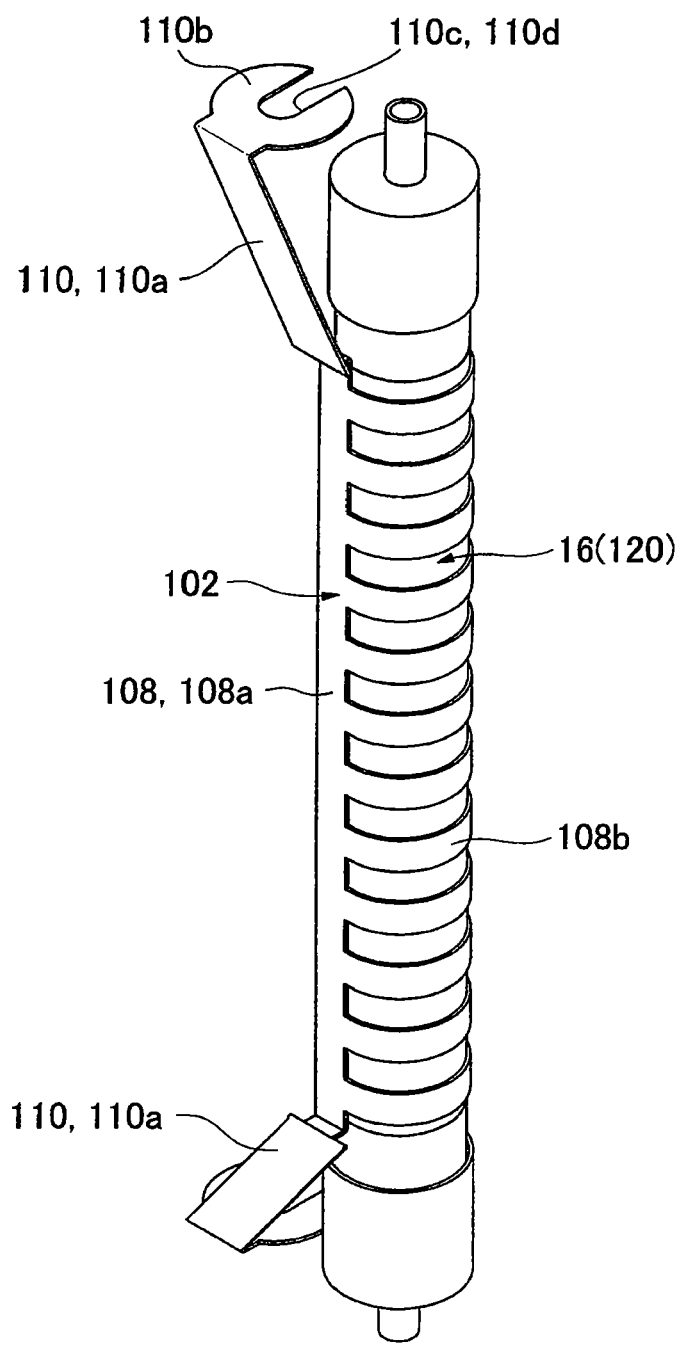
FIG. 10 is a perspective view showing the state in which the current collector shown in FIG. 7 is attached to the fuel cell unit.
Figure 11:
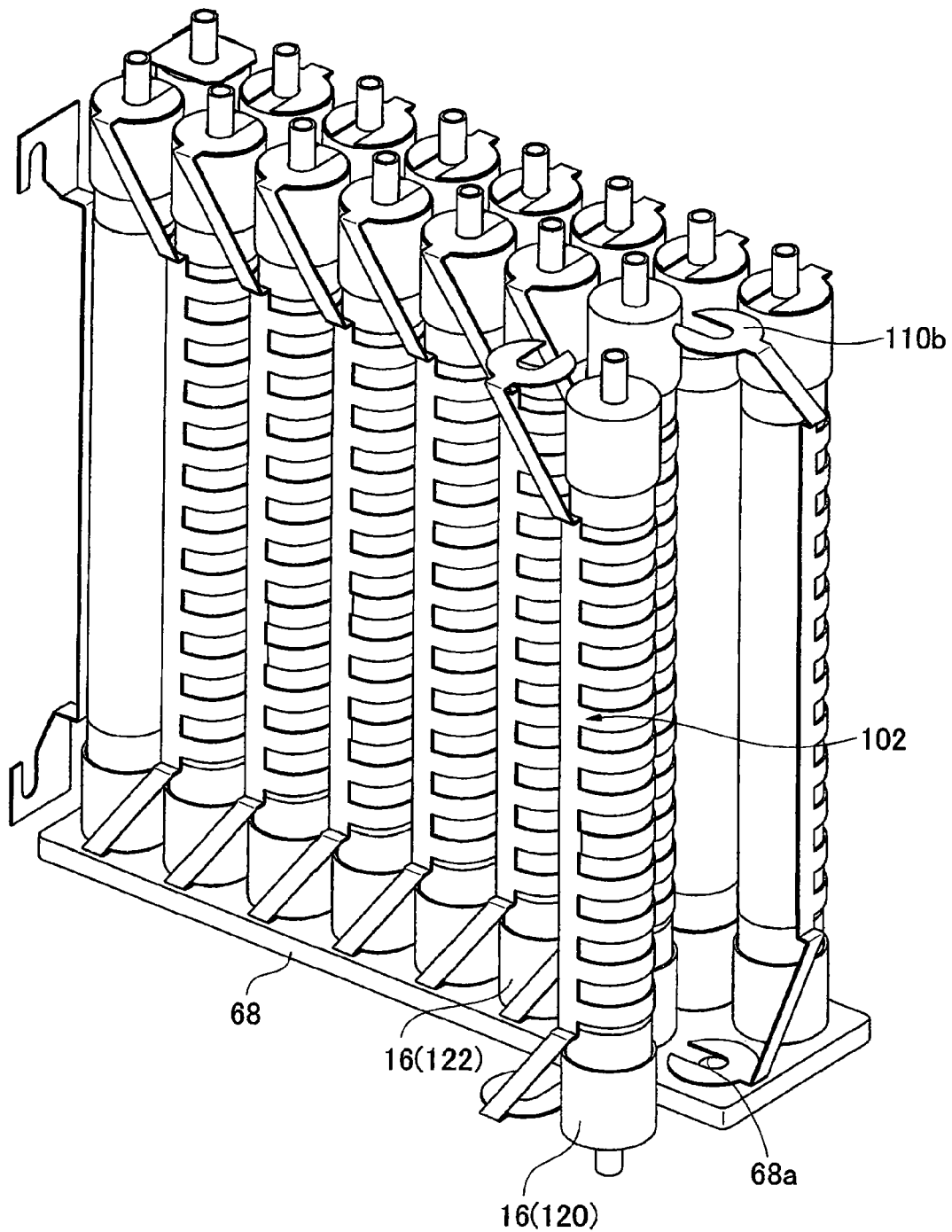
FIG. 11 is a perspective view showing the assembly process for a solid oxide fuel cell device (SOFC) fuel cell stack according to a first embodiment of the present invention.

Next, referring to FIG. 5 and FIGS. 7 through 11, the current collector 102 will be explained in detail. FIG. 7 is a perspective view showing a current collector used in a solid oxide fuel cell device (SOFC) fuel cell stack according to a first embodiment of the present invention; FIG. 8 is a front elevation view of the current collector shown in FIG. 7; FIG. 9 is a plan view of the current collector shown in FIG. 7; FIG. 10 is a perspective view showing the state in which the current collector shown in FIG. 7 is attached to the fuel cell unit; FIG. 11 is a perspective view showing the assembly process for a solid oxide fuel cell device (SOFC) fuel cell stack according to a first embodiment of the present invention.

First, the current collector 102 is furnished with: an air electrode connecting center portion 108, electrically connected to the entire outer circumferential surface of the outside electrode layer 92 which forms the air electrode of the fuel cell unit 16 (fuel cells 84), and connecting portions 110, electrically connected to the inside electrode terminals 86 attached to the internal electrode layer 90 serving as fuel electrode and respectively extending diagonally up and down toward to the two end portions of the adjacent fuel cell unit 16 from this center portion 108.

Furthermore, the current collector 102 center portion 108 is formed from a plumb portion 108a extending in the longitudinal direction along the fuel cell unit 16, and multiple comb-tooth portions 108b extending in an arc-shaped curve in the horizontal direction along the surface of the outside electrode layer 92 from the plumb portion 108a. The curvature radius of these comb-tooth portions 108b is set to be just slightly less than the curvature radius of the outer circumferential surface of the outside electrode layer 92, so that a bias force is created when it is attached, thereby making it easy to attach.

The connecting portion 110 of the current collector 102 is formed of: sloped portions 110a extending respectively in the upper and lower diagonal directions toward to the two ends of the adjacent fuel cell unit 16 (the fuel cells 84), and crimping surface portions 110b, which extend in the direction of the inside electrode terminals 86 from this connecting portion 110, and make surface contact so as to crimp the flat surfaces 86b of the inside electrode terminals 86 from the two end sides of the fuel cell unit 16. Furthermore, elongated holes 110c, a part of which are open to receive the cylindrical portions 86a of the inside electrode terminals 86 explained above, are formed on the connecting portion 110 crimping surface portions 110b, and these elongated holes 110c serve as engaging portions 110d for engaging the cylindrical portions 86a of the inside electrode terminals 86.

Next the process for assembling the multiple fuel cell units 16 to manufacture the fuel cell stack 14 will be explained. The process for assembling the fuel cell assembly 12 will be also explained.

First, as shown in FIG. 10, the current collector 102 is attached to the fuel cell unit 16 and the two are electrically connected to make a subassembly. At this point, a bias force is generated on the comb-tooth portions 108b of the center portion 108 of the current collector 102, and the current collector 102 can be stably attached.

Next, as shown in FIG. 11, a sub-assembled fuel cell unit 16, i.e., a fuel cell unit 16 (referred to here for convenience as first fuel cell unit 120) to which a current collector 102 has been attached, is inserted into a through hole 68a on the lower support plate 68. Next, the fuel cell unit 16 (120) is rotated toward the adjacent fuel cell unit 16 on the left side (this fuel cell unit 16 is referred to here for convenience as the second fuel cell unit 122), and the current collector 102 is brought into proximity with the fuel cell unit 16 (122). At this point, the cylindrical portion 86a of the inside electrode terminal 86 on the second fuel cell unit 16 (122) is received inside the current collector elongated hole 110c and is engaged by the elongated hole 110c (engaging portion 110d), while at the same time the crimping surface portions 110b crimp the second fuel cell unit 16 (122) from both sides to achieve a stable electrical connection. In this way, the sixteen fuel cell units 16 are attached to the lower support plate 68.

Following this, as shown in FIG. 5, the upper support plate 100 is attached, and assembly of the fuel cell unit 14 is completed.

Then, as shown in FIG. 6, the ten fuel cell units 14 are electrically connected in series to complete the assembly of the fuel cell assembly 12.

Next, the operations and in particular the relationship with the current collector 102, of the fuel cell assembly according to the above-explained first embodiment of the present invention will be explained in detail.

First, in the current collector 102 a current flows between the outside electrode layer 92 serving as the center outer circumferential portion of the first fuel cell unit 16 (120) and the inside electrode terminals 86 which form the two end portions of the second fuel cell unit 16 (122) adjacent to the first fuel cell unit 16 (120), therefore the distance over which current flows is shortened, and electrical resistance is decreased. Next, in the fuel cell unit 16 (the fuel cell 84) electrons move between the outside electrode layer 92 at the center outer circumferential portion of the first fuel cell unit 16 (120) and the electrodes at the top and bottom ends of the adjacent second fuel cell unit 16 (122), thereby shortening the electron movement distance and reducing electrical resistance. Furthermore, in the outside electrode layer 92 at the center outer circumferential portion of the first fuel cell unit 16 (120), current passes through the relatively low electrical resistance current collector 102, therefore current collection loss due to electrical resistance is low. As a result, the present invention enables the electrical generating efficiency of the fuel cells to be improved.

Next, stability when assembling the fuel cell assembly 12 can be improved because the current collector 102 connecting portions 110 connected to the inside electrode terminals 86 at both end portions of the second fuel cell unit 16 (122) are furnished with crimping surface portions 110*b* which crimp the second fuel cell unit 16 (122) from above and below. Furthermore, the current collector 102 makes surface contact with the inside electrode terminals 86 at the end portion of the second fuel cell unit 16 (122), therefore contact surface area increases, so contact resistance between the current collector 102 and the fuel cell inside electrode terminals 86 can be reduced.

Next, the current collector 102 connecting portions 110 connected to the inside electrode terminals 86 at the two end portions of the second fuel cell unit 16 (122) are furnished with sloped portions 110*a* sloping in the direction of the second fuel cell unit 16 (122), therefore the first fuel cell unit 16 (120) and the second fuel cell unit 16 (122) can be connected over a short distance, and electrical resistance can be reduced.

Next, the crimping surface portions 110*b* of the connecting portion 110 of the current collector 102 are furnished with engaging portions 110*d* having elongated holes 110*c* open in one part for receiving the cylindrical portions 86*a*, therefore when attaching the crimping surface portions 110*b* of the connecting portion 110 of the current collector 102 to the second fuel cell unit 16 (122), the current collector 102 can be assembled to the second fuel cell unit 16 (122) simply by bringing the crimping surface portions 110*b* into contact with the inside electrode terminals 86 flat surfaces 86*b* and inserting and sliding the cylindrical portions 86*a*.

Furthermore, in the first embodiment, the current collector 102 is electrically connected and pre-assembled to the first fuel cell unit 16 (120) the outside electrode layer 92, following which this sub-assembled first fuel cell unit 16 (120) is inserted into the through hole 68*a* in the lower support plate 68, then the current collector 102 is connected to the inside electrode terminals 86 in the adjacent second fuel cell unit 16 (122), then these fuel cell units 16 are attached to the lower support plate 68, so the fuel cell assembly 12 can be assembled by a simple method.

Figure 12:
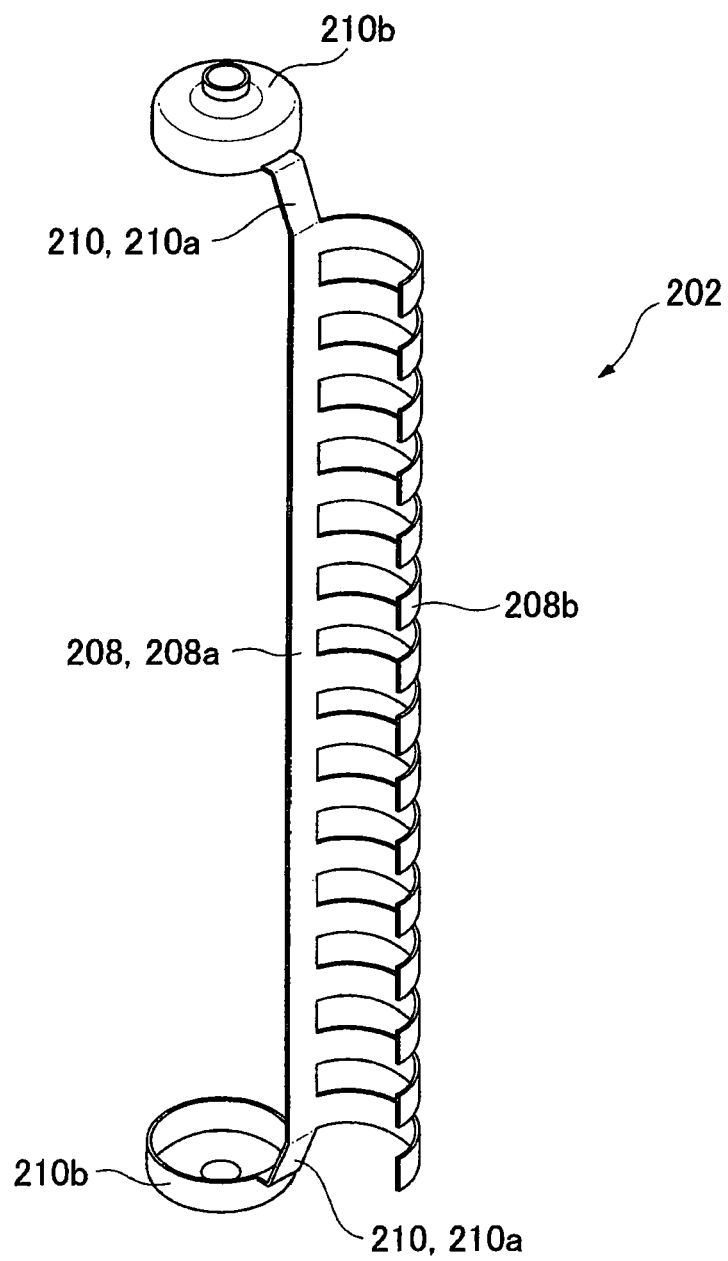
FIG. 12 is a perspective view showing a current collector used in a solid oxide fuel cell device (SOFC) fuel cell stack according to a second embodiment of the present invention.
Figure 15:
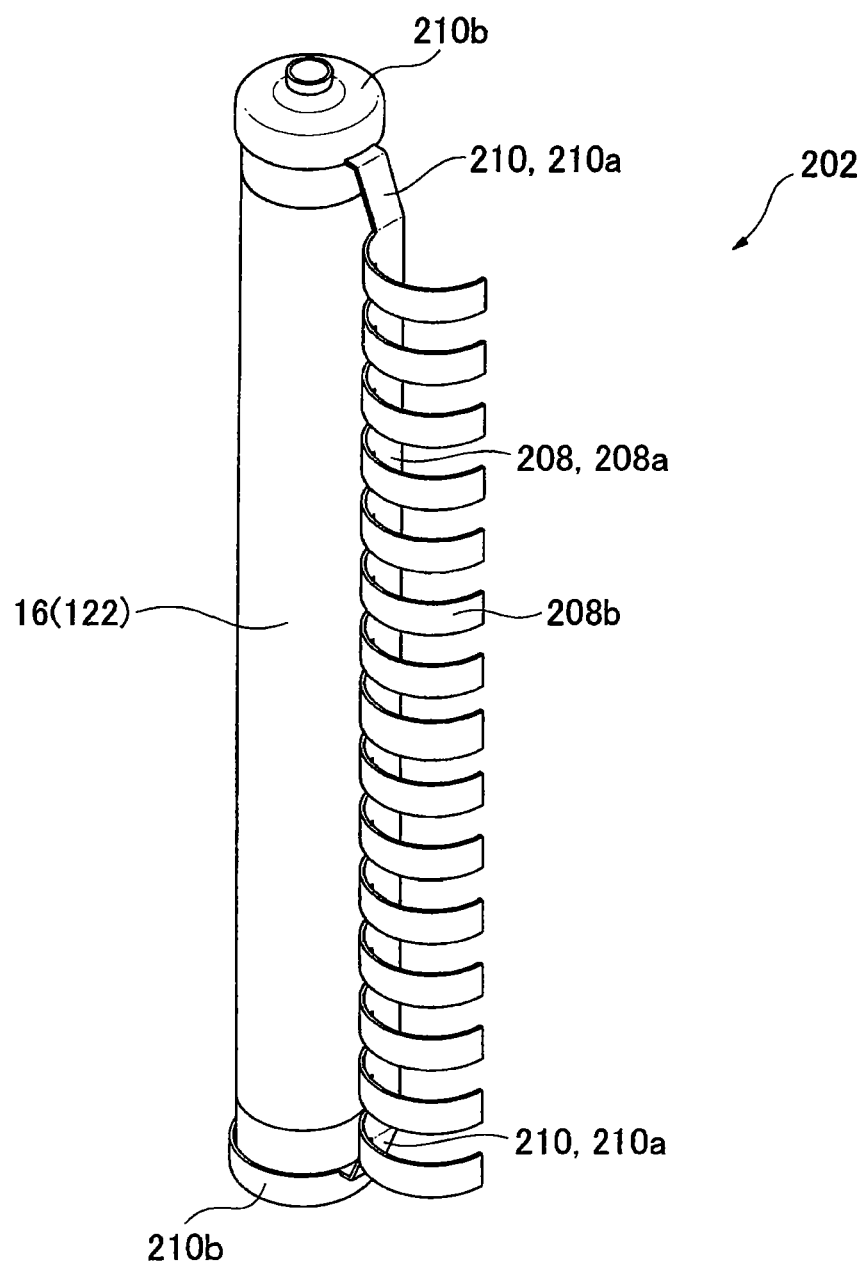
FIG. 15 is a perspective view showing the state in which the current collector shown in FIG. 12 is attached to the fuel cell unit.
Figure 16:
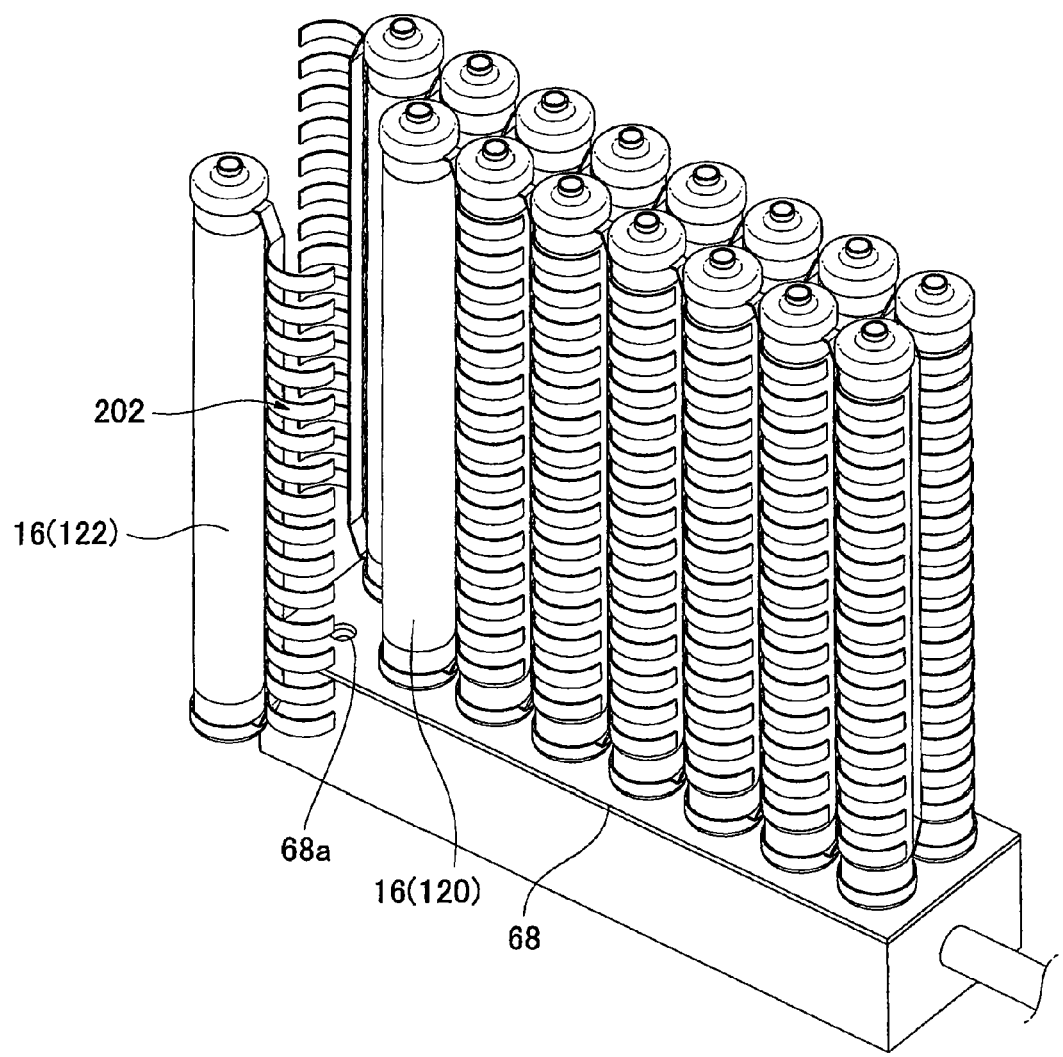
FIG. 16 is a perspective view showing the assembly process for a solid oxide fuel cell device (SOFC) fuel cell stack according to a second embodiment of the present invention.

Next, referring to FIGS. 12 through 16, a second embodiment of the present invention will be explained. In this second embodiment, only the structure of the current collector differs from that of the first embodiment, therefore the structure of the current collector in the second embodiment will be explained below. FIG. 12 is a perspective view showing a current collector used in a solid oxide fuel cell device (SOFC) fuel cell stack according to a second embodiment of the present invention; FIG. 13 is a front elevation view of the current collector shown in FIG. 12; FIG. 14 is a plan view of the current collector shown in FIG. 12; FIG. 15 is a perspective view showing the state in which the current collector shown in FIG. 12 is attached to the fuel cell unit; FIG. 16 is a perspective view showing the assembly process for a solid oxide fuel cell device (SOFC) fuel cell stack according to a second embodiment of the present invention.

First, in the second embodiment a current collector 202 is furnished with: an air electrode connecting center portion 208, electrically connected to the entire outer circumferential surface of the outside electrode layer 92 which forms the air electrode of the fuel cell unit 16 (fuel cells 84), and connecting portions 210, electrically connected to the inside electrode terminals 86 attached to the internal electrode layer 90 serving as fuel electrode, and respectively extending diagonally up and down toward to the two end portions of the adjacent fuel cell unit 16 from this center portion 208.

Furthermore, the current collector 202 center portion 208 is formed from a plumb portion 208*a* extending in the longitudinal direction along the fuel cell unit 16, and multiple comb-tooth portions 208*b* extending in an arc-shaped curve in the horizontal direction along the surface of the outside electrode layer 92 from the plumb portion 208*a*. The curvature ratio of these comb-tooth portions 208*b* is set to be just slightly less than the curvature radius of the outer circumferential surface of the outside electrode layer 92, so that a bias force is created when it is attached, thereby making it easy to attach.

The current collector 202 connecting portion 210 is formed of: sloped portions 210*a* extending respectively in the upper and lower diagonal directions toward to the two ends of the adjacent fuel cell unit 16 (the fuel cells 84), and cap portions 210*b*, which extend in the direction of the inside electrode terminals 86 from this sloped portion 210. Furthermore, center holes 210*c* are formed at the center of the cap portion 210*b* of the connecting portion 210 of the current collector 202, and the cylindrical portions 86*a* of the above-explained 86 penetrate these center holes 210*c*. Outer circumferential portions 210*d* are formed on the cap portions 210*b*, and through these outer circumferential portions 210*d*, the cap portions 210*b* are attached so as to fully cover the outer perimeter side of the flat surfaces 86*b* on the inside electrode terminals 86.

Here, as shown in FIG. 14, the sloped portions 210*a* of the connecting portion 210 of the current collector 202 are formed to have the minimum length along the line B connecting the center 120*a* of the first fuel cell unit 16 (120) and the center 122*a* of the second fuel cell unit 16 (122) as seen in top view.

Next, the process for assembling the multiple fuel cell units 16 to manufacture the fuel cell stack 14 will be explained.

First, as shown in FIG. 15, the inside electrode terminals 86 at both ends of the second fuel cell unit 16 (122) are covered by the current collector 202 cap portions 210*b* to electrically connect the outside electrode layer 92 and the inside electrode terminals 86 and assemble same. At this point, the cap portions 210*b* at both ends are pulled toward the inside in the longitudinal direction by the bias force of the connecting portion 210 so that a stable connecting state is obtained.

Next, as shown in FIG. 16, a sub-assembled second fuel cell unit 16 (122), i.e., one to which a current collector 202 has been attached, is inserted into a through hole 68*a* on the lower support plate 68. Next, the fuel cell unit 16 (122) is rotated toward the adjacent fuel cell unit 16 (120) on the right side and the current collector 202 is brought into proximity with the first fuel cell unit 16 (120). At this point, a bias force is generated on the comb-tooth portions 108*b* of the center portion 208 of the current collector 202, and the current collector 202 center portion 208 can be stably attached to the first fuel cell unit 16 (120) outside electrode layer 92. In this way, the sixteen fuel cell units 16 are attached to the lower support plate 68. Following this, the upper support plate 100 is attached, and assembly of the fuel cell unit 14 is completed.

In the second embodiment, the current collector 202 connecting portion 210 is furnished with cap portions 210b for contacting the inside electrode terminals 86 at both end portions of the second fuel cell unit 16 (122), therefore the current collector 202 can be stably attached to the two end portions of the second fuel cell unit 16 (122).

In the second embodiment, the current collector 202 connecting portion 210 sloped portions 210a are formed at the minimum distance along the line B connecting the first fuel cell unit 16 (120) center portion 120a and the center portion 122a of the second fuel cell unit 16 (122) as seen in top view, therefore the first fuel cell unit 16 (120) and the second fuel cell unit 16 (122) are connected at the minimum distance by the current collector 202 connecting portion 210, and electrical resistance is reduced.

Next, referring to FIG. 17, a third embodiment of the present invention will be explained. In this third embodiment, only the structure of the current collector differs from that of the first embodiment, therefore the structure of the current collector in the third embodiment will be explained below. FIG. 17 is a perspective view showing the upper half of a current collector used in a solid oxide fuel cell device (SOFC) fuel cell stack according to a third embodiment of the present invention.

As shown in FIG. 17, in the third embodiment the current collector 302 has crimping surface portions 304 similar to the first embodiment at both the upper and lower sides, and electrically conductive cushions 306 serving as variation absorbing portions are adhered to the contact surface with the flat surfaces 86b on the inside electrode terminals 86 of these crimping surface portions 304.

These cushions 306 are constituted to shrink in the longitudinal direction when compressed, and can therefore absorb variations in the longitudinal direction of the fuel cell.

Figure 19:
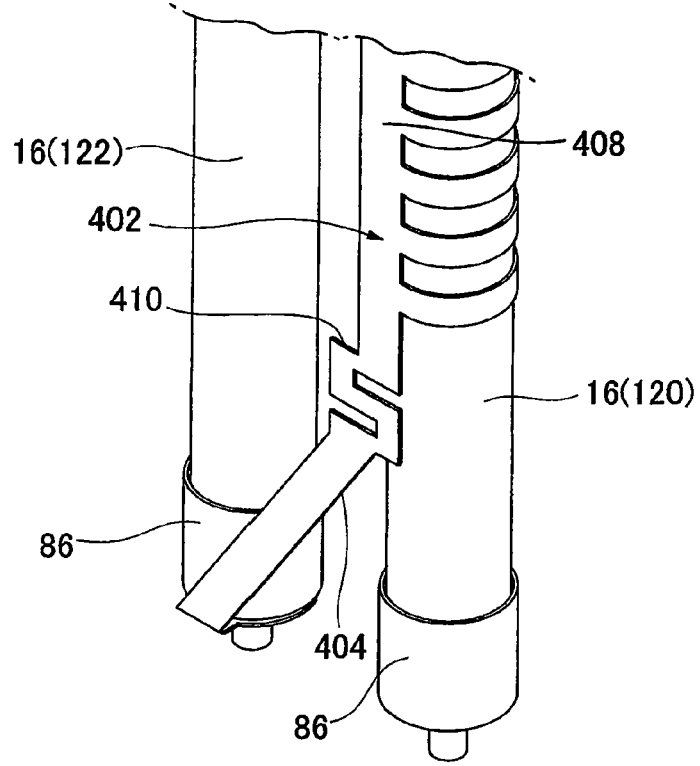
FIG. 19 is a schematic view showing a portion of the lower half of a fuel cell stack including a current collector according to a second example of a fourth embodiment of the present invention.

Next, referring to FIGS. 18 and 19, a fourth embodiment of the present invention will be explained. In this fourth embodiment, only the structure of the current collector differs from that of the first embodiment, therefore the structure of the current collector in the fourth embodiment will be explained below. FIG. 18 is a schematic view showing a portion of the lower half of a fuel cell stack including a current collector according to a first example of the fourth embodiment of the present invention; FIG. 19 is a schematic view showing a portion of the lower half of a fuel cell stack including a current collector according to a second example of the fourth embodiment of the present invention.

As shown in FIG. 18, in the first example of the fourth embodiment the current collector 42 connecting portion 404 is furnished at its midway portion with an approximately S-shaped stepped portion 406. This stepped portion 406 has an S-shape, and is therefore easily elastically deformed.

In the first example of the fourth embodiment, when a force acts on this stepped portion 406, variation in the longitudinal direction and the width direction of the fuel cell unit 16 (the fuel cell 84) can be absorbed by elastic deformation.

Next, as shown in FIG. 19, in the second example of the fourth embodiment there is an approximately S-shaped stepped portion 410 furnished in the vicinity proximate to the center portion 408 of the current collector 402 connecting portion 404.

In the second example of the fourth embodiment, as well, variation in the longitudinal direction and the width direction of the fuel cell unit 16 (the fuel cell 84) can be absorbed by the stepped portion 410.

Figure 20:
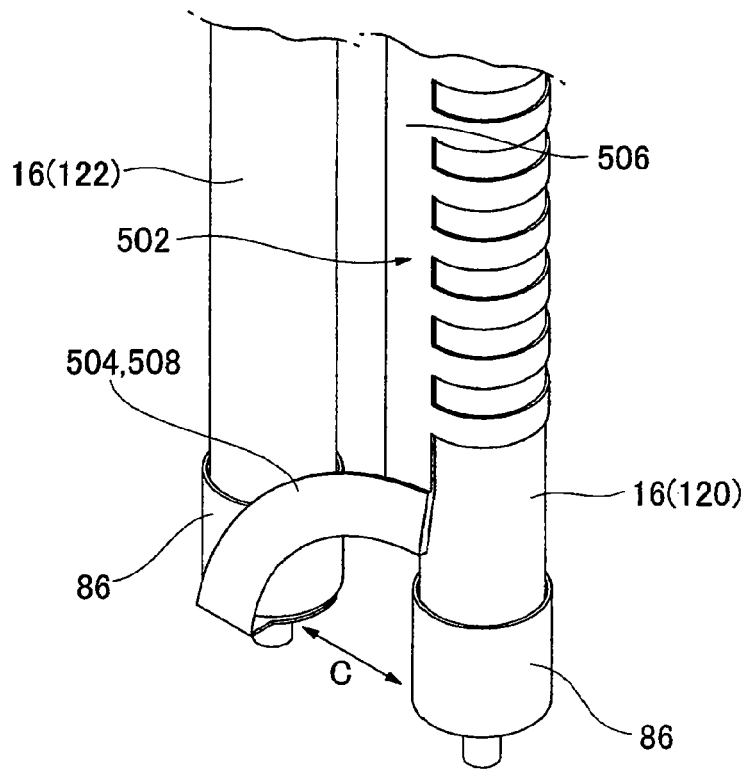
FIG. 20 is a schematic view showing a portion of the lower half of a fuel cell stack including a current collector according to a fifth embodiment of the present invention.

Next, referring to FIG. 20, a fifth embodiment of the present invention will be explained. In this fifth embodiment, only the structure of the current collector differs from that of the first embodiment, therefore the structure of the current collector in the fifth embodiment will be explained below. FIG. 20 is a schematic view showing a portion of the lower half of a fuel cell stack including a current collector according to a fifth embodiment of the present invention.

As shown in FIG. 20, in the fifth embodiment the current collector 502 connecting portion 504 is furnished with a convex radiused portion 508 facing the center portion 506 of the current collector 502. In the fifth embodiment the current collector 502 connecting portion 504 is furnished with a convex radiused portion 508 facing the center portion 506, and therefore connects the outside electrode layer 92, which is the center outer circumferential portion of the first fuel cell unit 16 (120), to the inside electrode terminals 86 forming both ends of the second fuel cell unit 16 (122) over a short distance C, while avoiding contact and shorting between the inside electrode terminals 86 forming the electrodes of both ends of the first fuel cell unit 16 (120) itself. As a result, the pitch at which the fuel cell units are arrayed can be narrowed.

Figure 21:
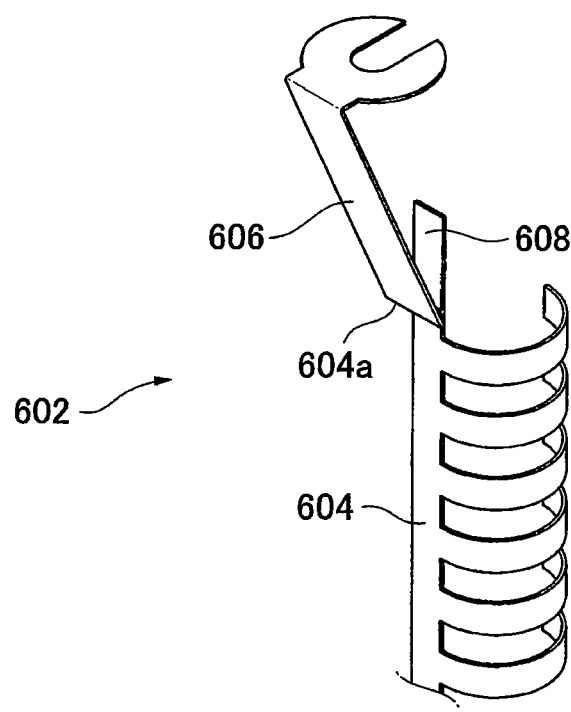
FIG. 21 is a perspective view showing the upper half of a current collector used in a solid oxide fuel cell device (SOFC) fuel cell stack according to a sixth embodiment of the present invention.

Next, referring to FIG. 21, a sixth embodiment of the present invention will be explained. In this sixth embodiment, only the structure of the current collector differs from that of the first embodiment, therefore the structure of the current collector in the sixth embodiment will be explained below. FIG. 21 is a perspective view showing the upper half of a current collector used in a solid oxide fuel cell device (SOFC) fuel cell stack according to a sixth embodiment of the present invention.

As shown in FIG. 21, in the sixth embodiment the center portion 604 of the current collector 602 is furnished with stress relief portions 608 respectively extending upward further outward and downward further outward than the portion 604a proximate to the connecting portion 606.

In the sixth embodiment, because the stress relief portion 608 is provided, concentration of stress arising in the proximate portion 604a of the connecting portion 606 of the center portion 604 of the current collector 602 is relieved even if a force acts on the connecting portion 606 of the current collector 602.

Figure 22:
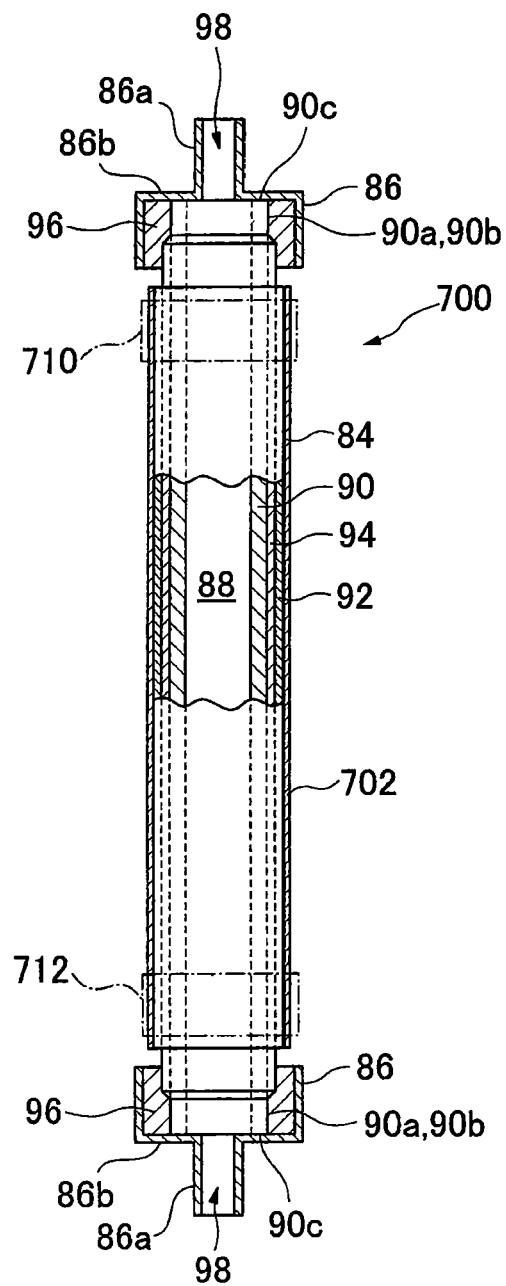
FIG. 22 is a partial sectional view showing a solid oxide fuel cell device (SOFC) fuel cell unit according to a seventh embodiment of the present invention.
Figure 23:
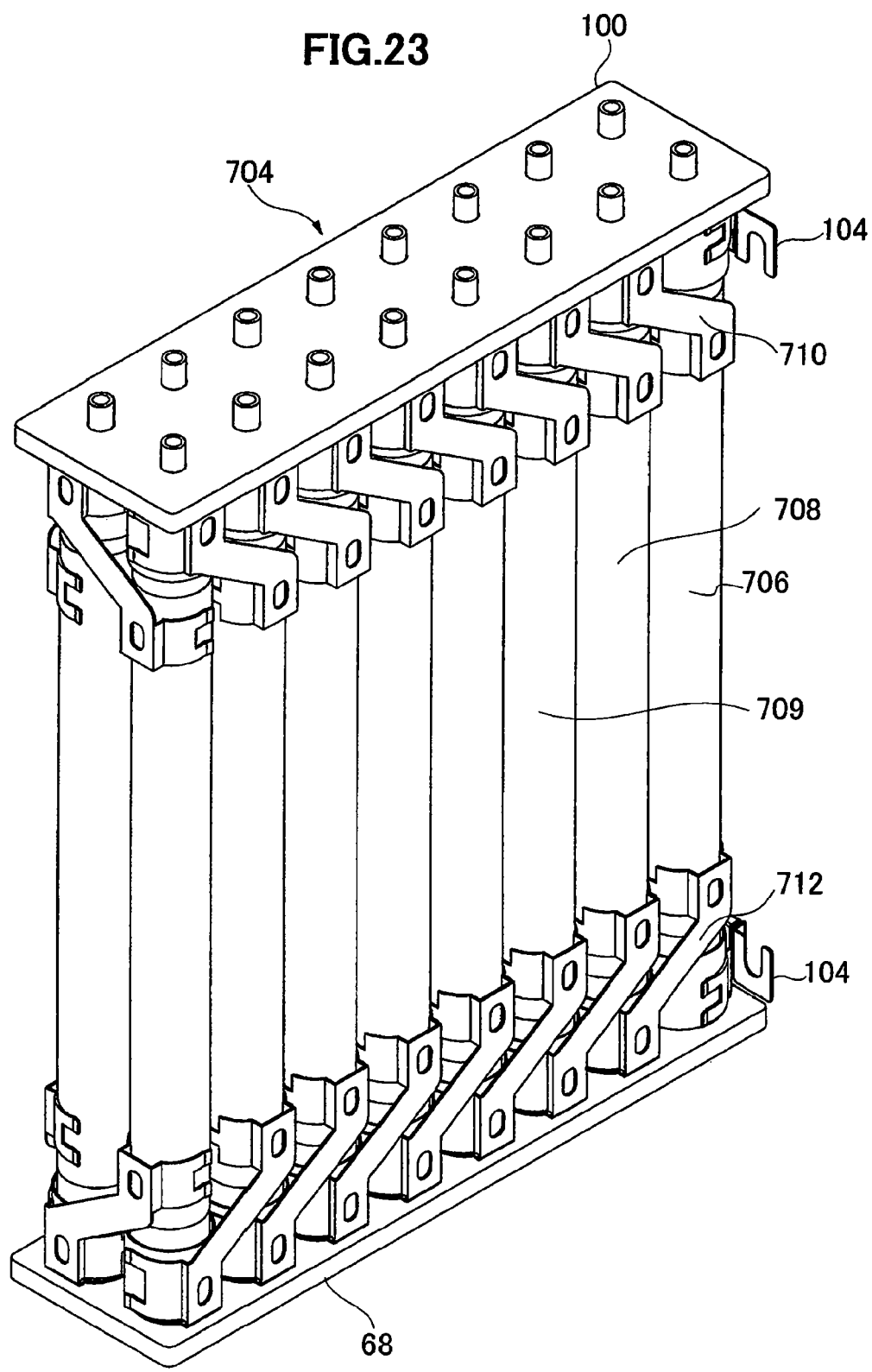
FIG. 23 is a perspective view showing a solid oxide fuel cell device (SOFC) fuel cell stack according to a seventh embodiment of the present invention.
Figure 24:
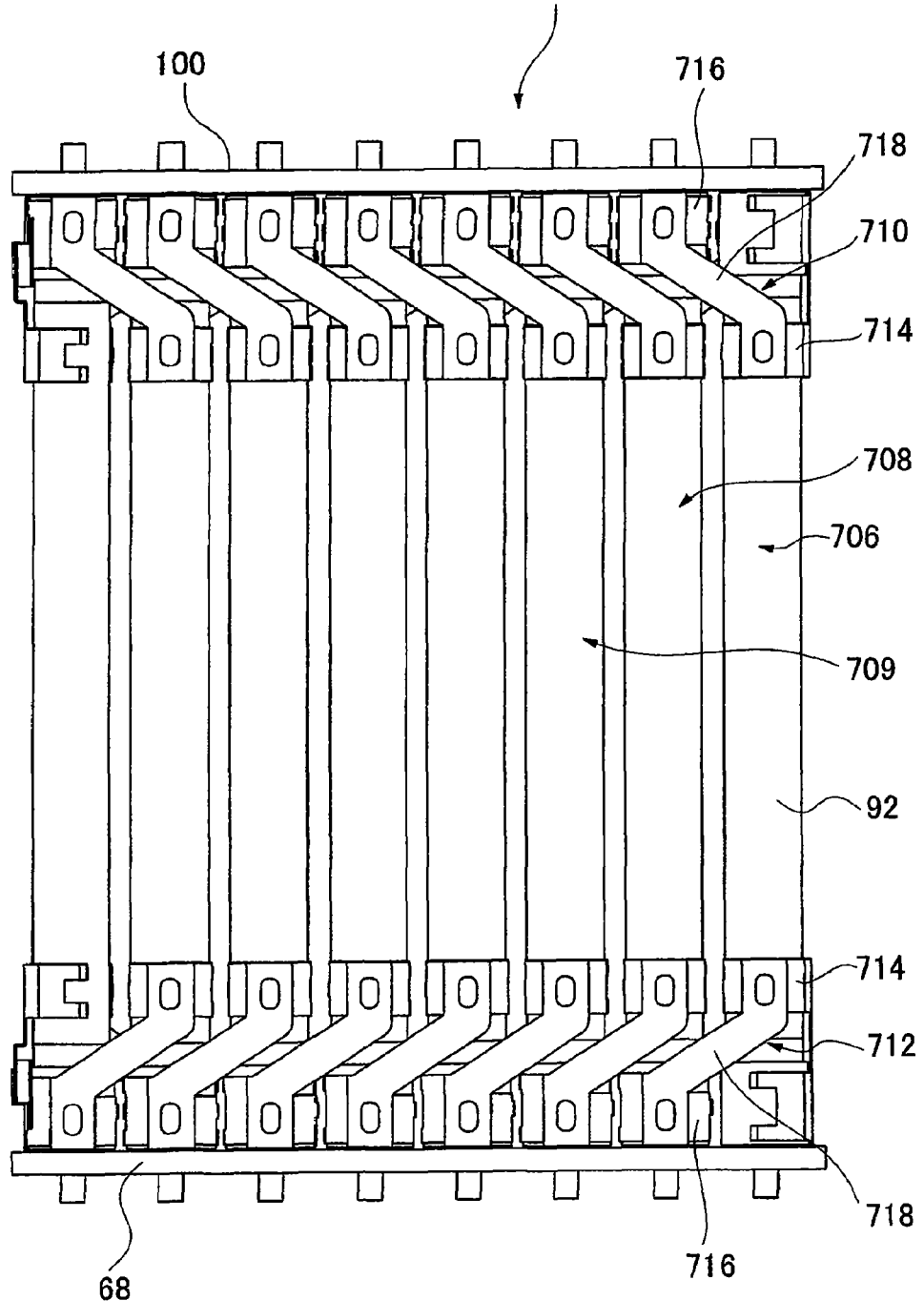
FIG. 24 is a front elevation view showing a solid oxide fuel cell device (SOFC) fuel cell stack according to a seventh embodiment of the present invention.
Figure 25:
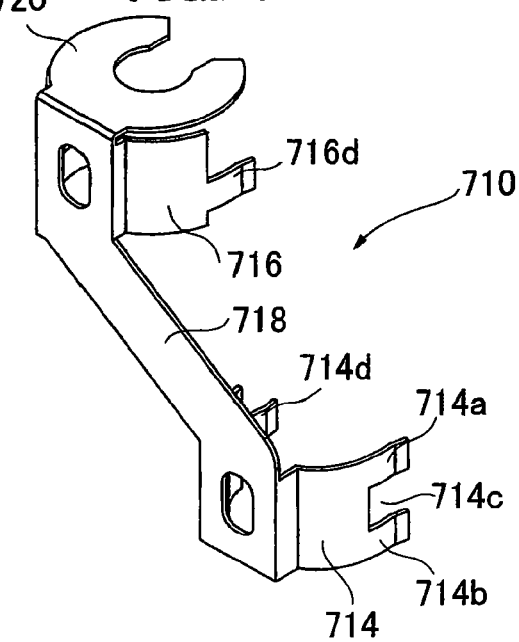
FIG. 25 is a perspective view showing current collectors used in a solid oxide fuel cell device (SOFC) fuel cell stack according to a seventh embodiment of the present invention.
Figure 26:
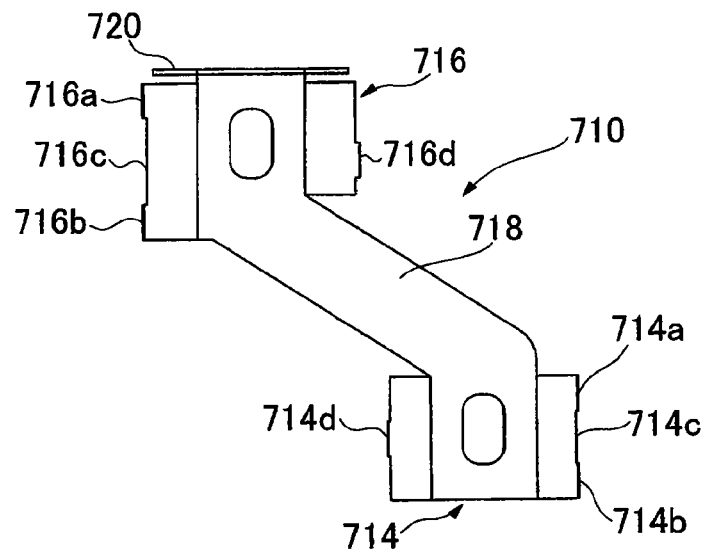
FIG. 26 is a front elevation of the current collector shown in FIG. 25.
Figure 27:
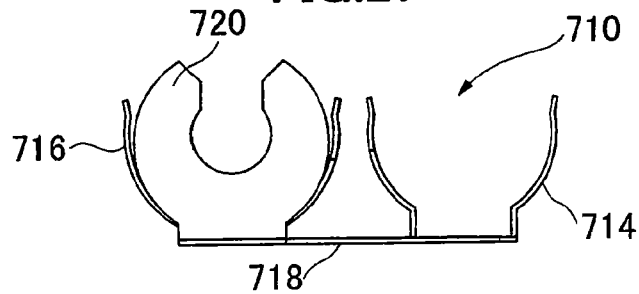
FIG. 27 is a plan view of the current collector shown in FIG. 25.
Figure 28:
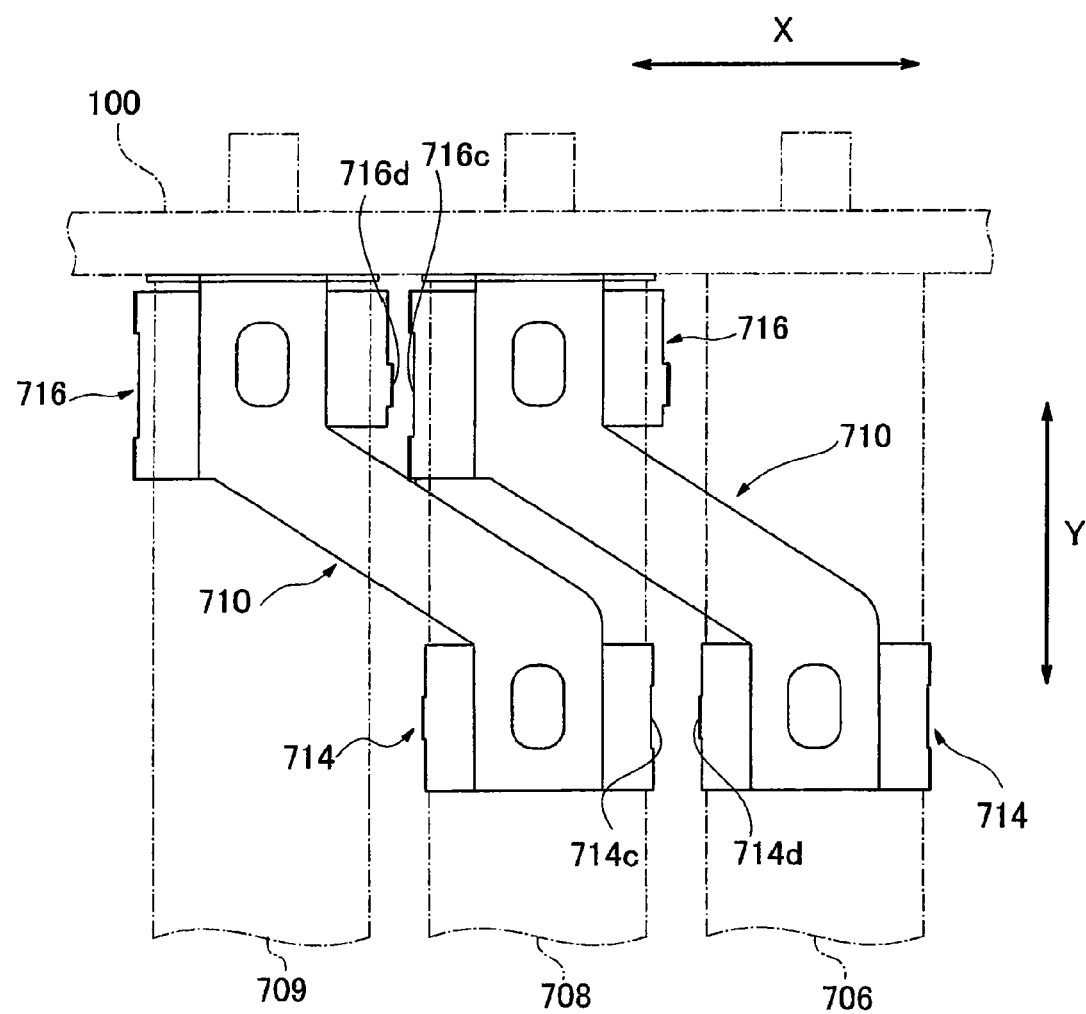
FIG. 28 is a front elevation view showing the adjacent disposition of the current collectors shown in FIG. 25.

Next, referring to FIGS. 22 through 28, a seventh embodiment of the present invention will be explained. FIG. 22 is a partial sectional view showing a solid oxide fuel cell device (SOFC) fuel cell unit according to a seventh embodiment of the present invention; FIG. 23 is a perspective view showing a solid oxide fuel cell device (SOFC) fuel cell stack according to a seventh embodiment of the present invention; FIG. 24 is a front elevation showing a solid oxide fuel cell device (SOFC) fuel cell stack according to a seventh embodiment of the present invention; FIG. 25 is a perspective view showing current collectors used in a solid oxide fuel cell device (SOFC) fuel cell stack according to a seventh embodiment of the present invention; FIG. 26 is a front elevation of the current collector shown in FIG. 25; FIG. 27 is a plan view of the current collector shown in FIG. 25; FIG. 28 is a front elevation showing the adjacent disposition of the current collectors shown in FIG. 25.

First, as shown in FIG. 22, the fuel cell unit 700 according to the present embodiment has the same basic structure as the fuel cell unit 16 of the first embodiment shown in FIG. 4. What differs is the point that a collecting film 702 is provided on the outer circumferential side of the outside electrode layer 92 in the fuel cell unit 700 of this embodiment. Attached to this current collector film is a first current collector 710 and a second current collector 712, explained in detail below.

This current collector film 702 is a porous (air hole) electrically conductive film, comprising Ag, Pd, and LSCF. The thickness of the current collector film 702 is preferably 0.1 to 50 um, and more preferably 0.5 to 30 um. The collecting film 702 functions as an electrical path when the outside electrode layer 92 is thin and electricity cannot easily pass through it, or when it is constructed of a low conductivity material.

Note that this collecting film 702 may be omitted as needed. When the collecting film 702 is omitted, the first current collector 710 and second current collector 712 are directly attached to the outside perimeter of the outside electrode layer 92.

As shown in FIGS. 23 and 24, the fuel cell stack 704 according to the present embodiment also has the same basic structure as the fuel cell stack 14 of the first embodiment shown in FIG. 5, and only the structure of the current collector differs. Below the structure of the current collector specifically is explained. Note that for convenience, the right-most fuel cells positioned in the front row in FIGS. 23 and 24 are referred to as first fuel cells 706, and the fuel cells adjacent on the left side to these first fuel cells 706 are referred to as second fuel cells 708.

In the present embodiment, a first current collector 710 provided on the upper side of the fuel cell, and a second current collector 712 provided on the lower side thereof are provided as current collectors. These first current collector 710 and second current collector 712 have a symmetrical structure about the vertical direction.

These first current collector 710 and second current collector 712 are metal current collectors, a heat-resistant alloy coated with silver. A desirable heat-resistant alloy is, for example, a ferrite alloy forming an alumina coating film. This metal first current collector 710 and second current collector 712 have rigidity (strength) so that the required support rigidity can be obtained when they are attached to fuel cells.

The metal material for these current collectors is also the same in the current collectors in the first through sixth embodiments explained above.

As shown in FIGS. 25 through 27, the first current collector 710 is provided with an outside electrode gripping portion 714 positioned below, an inside electrode gripping portion 716 positioned above, a connecting portion 718 connecting these gripping portions 714 and 716, and a crimping surface portion 720 for crimping the flat surfaces 86b of the inside electrode terminals 86 from the top end side of the fuel cell unit 700.

Similarly, the second current collector 712 is also provided with an outside electrode gripping portion 714 positioned above, an inside electrode gripping portion 716 positioned below, a connecting portion 718 connecting these gripping portions 714 and 716, and a crimping surface portion 720 for crimping the flat surfaces 86b of the inside electrode terminals 86 from the bottom end side of the fuel cell unit 700.

Next, as shown in FIGS. 23 and 24, the outside electrode gripping portion 714 on the first current collector 710 is connected to the outside electrode layer (first electrode) 92 on the first fuel cell 706 via the collecting film 702. At the same time the first current collector 710 inside electrode gripping portion 716 is connected to the inside electrode terminal (second electrode) 86 at the top end of the second fuel cell 708.

Similarly, the outside electrode gripping portion 714 on the second current collector 712 is also connected to the outside electrode layer (first electrode) 92 on the first fuel cell 706 via the collecting film 702. At the same time, the second current collector 712 inside electrode gripping portion 716 is connected to the inside electrode terminal (second electrode) 86 at the bottom end of the second fuel cell 708.

The first current collector 710 outside electrode gripping portion 714 and the second current collector 712 outside electrode gripping portion 714 here are respectively disposed at the two end portions of the outside electrode layer 92 furthest apart in the longitudinal direction from the center of the first fuel cell 706.

Next, referring to FIGS. 25 through 28, the gripping portions 714 and 716 of the current collectors 710 and 712 will be explained in detail.

As shown in FIGS. 25 and 28, the outside electrode gripping portion 714 positioned at the bottom of the first current collector 710 comprises two protruding portions 714a and 714b serving as the first gripping portion, extending in the X direction (circumferential direction) perpendicular to the longitudinal direction Y of the fuel cell so as to surround the outside perimeter of the first fuel cell 706; a cutout portion 714b formed between these protruding portions 714a and 714b; and a single protruding portion 714d serving as second gripping portion, opposing the protruding portions 714a and 714b. The second current collector 712 has a similar structure.

Here, as shown in FIG. 28, the position along the longitudinal direction Y of the fuel cell of the one protrusion 714d serving as the second gripping portion of the first electrical current collector 710 outside electrode gripping portion 714 attached to the first fuel cell 706 is arranged to conform to the position in the longitudinal direction Y of the fuel cell of the cutout portion 714c formed by the two protrusions 714a and 714b serving as the first gripping portion of the first electrical current collector 710 attached to the adjacent second fuel cell 708. The second current collector 712 has a similar structure.

Similarly, as shown in FIGS. 25 through 28, the inside electrode gripping portion 716 positioned at the top of the first current collector 710 comprises two protruding portions 716a and 716b serving as the first gripping portion, extending in the X direction (circumferential direction) perpendicular to the longitudinal direction Y of the fuel cell so as to surround the outside perimeter of the inside electrode terminals 86; a cutout portion 716c formed between these protruding portions 716a and 716b; and a single protruding portion 716d serving as second gripping portion, opposing the protruding portions 716a and 716b. The second current collector 712 has a similar structure.

Similarly, as shown in FIG. 28, the position in the longitudinal direction Y of the fuel cell of the cutout portion 716c formed by the two protrusions 716a and 716b serving as the first gripping portion of the first electrical current collector 710 inside electrode gripping portion 716 attached to the adjacent second fuel cell 708 is arranged to conform to the position along the longitudinal direction Y of the fuel cell of the one protrusion 716d serving as the second gripping portion of the first electrical current collector 710 attached to the adjacent third fuel cell 709. The second current collector 712 has a similar structure.

Next, the operations of the fuel cell and fuel cells according to the seventh embodiment of the present invention will be explained.

Firstly, in the fuel cell assembly according to the present embodiment, the first current collector 710 and second current collector 712 serving as the current collectors which electrically connect the first fuel cell 706 and its adjacent second fuel cell 708 respectively distribute and source current generated at the electrical generating portion of the first fuel cell 706 (the internal electrode layer 90, outside electrode layer 92, and electrolyte layer 94) to the inside electrode terminals 86 on the second fuel cell 708 from two different locations on the outside electrode layer 92 of the first fuel cell 706, therefore the numerical value of the current respectively flowing to the first current collector 710 and the second current collector 712 is reduced, and electrical resistance is thus lowered. Furthermore, because in the first fuel cell 706 outside electrode layer 92 current moves to the closer of the two locations, the electron movement path in the outside electrode layer 92 is shortened, which reduces electrical resistance.

Secondly, in the fuel cell assembly according to the present embodiment, the first fuel cell 706 and the second fuel cell 708 are respectively provided with an inside electrode terminal 86 at both ends, and since current generated in the electrolyte layer 94 of the first fuel cell 706 is distributed and sourced to both ends of the second fuel cell 708 by the electrically independent first current collector 710 and second current collector 712, current will flow on one current path (one current collector) even if some malfunction prevents current from flowing on the other current path (the other current collector), thus allowing a current path to be easily secured.

Thirdly, in the fuel cell assembly according to the present embodiment, the first current collector 710 and second current collector 712 are mutually separately disposed mechanical current collectors (metal current collectors), having a predetermined rigidity necessary to support the first fuel cell 706 and the second fuel cell 708, and support the first fuel cell 706 and the second fuel cell 708 in two locations, therefore the support rigidity and stability of the first fuel cell 706 and second fuel cell 708 is improved, leading to a highly rigid fuel cell assembly and a stable structure.

Fourthly, in the fuel cell assembly according to the present embodiment, the first current collector 710 and second current collector 712 are separated from one another along the direction in which the fuel gas flows on the first fuel cell 706 outside electrode layer 92, thereby shortening the moving distance inside the first fuel cell 706 outside electrode layer 92 for the large current generated on the fuel gas upstream side, which reduces electrical resistance.

Fifthly, in the fuel cell assembly according to the present embodiment, the first current collector 710 and second current collector 712 are disposed to be mutually separated in the longitudinal direction from the center on the first fuel cell 706 outside electrode layer 92, therefore current arising in the region separated in the longitudinal direction from the center of the first fuel cell 706 outside electrode layer 92 flows to the nearer current collector, thus enabling the distance over which current moves in the first fuel cell 706 outside electrode layer 92 to be shortened, which results in reduced electrical resistance.

Sixthly, in the fuel cell assembly according to the present embodiment, the first current collector 710 and second current collector 712 are respectively disposed at the two end portions most separated in the longitudinal direction from the center of the first fuel cell 706 outside electrode layer 92, therefore the distance between the portion connecting the first current collector 710 and second current collector 712 with the first fuel cell 706 outside electrode layer 92 and the portion connecting the inside electrode terminals 86 at both ends of the second fuel cell 708 is shortened, thereby shortening the path over which current travels in the first current collector 710 and second current collector 712, which decreases electrical resistance in the first current collector 710 and the second current collector 712.

Seventhly, in the fuel cell assembly according to the present embodiment, the first fuel cell 706 outside electrode layer 92 is provided on the outside perimeter side with a porous collecting film 702; because the first current collector 710 and second current collector 712 are electrically connected to this collecting film 702, there is no need to connect a fine current collector, for example of metal, on the first fuel cell 706 outside electrode layer 92, and the surface area over which air is taken in from the first fuel cell 706 outside electrode layer 92 expands and turbulence of air flowing along the collecting film 702 is reduced, such that shortages of air taken in by the first fuel cell 706 can be prevented.

Eighthly, in the fuel cell assembly according to the present embodiment, a cutout portion 714c is formed at the respective attachment portions of the first current collector 710 and second current collector 712 to the first fuel cell 706 and second fuel cell 708 in such a way as not to mutually contact the attachment portions of other current collectors disposed in the same position along the longitudinal direction of adjacent fuel cells, and to be separated by a predetermined distance from other current collectors, therefore contact and discharge between adjacent current collectors can be prevented. As a result, the distance between adjacent fuel cells can be shortened, and fuel cell assemblies can be made more compact.

Ninthly, in the fuel cell assembly according to the present embodiment, the attachment portions of the first current collector 710 and second current collector 712 are respectively furnished with a first gripping portion on which two protrusions 714a and 714b are formed, and a second gripping portion on which one protrusion 714d is formed, and the one protrusion 714d on the second gripping portion is formed at a position corresponding to the position of the first gripping portion cutout portion 714c in the longitudinal direction of the fuel cell, therefore contact and discharge between adjacent current collectors can be prevented, and the first current collector 710 and second current collector 712 can be stably attached to the fuel cell.

The operations set forth in the above-explained 1 through 7 are similarly implemented in the fuel cell assemblies according to the first through sixth embodiments.

Note that in the present embodiment, no electrode terminal is provided on the inside of both terminal portions of the fuel cell, and therefore the embodiment can also be applied to a fuel cell in which the current collector is connected directly or through an intermediary object to the internal electrode layer. There are also cases in which "fuel cell" is used to mean a fuel cell unit including internal terminals.

What is claimed is:

1. A fuel cell assembly comprising:
a vertically standing tubular first fuel cell;
a vertically standing tubular second fuel cell shaped similarly to and disposed adjacent to the first fuel cell; and
vertically spaced upper and lower current collectors attached to the first and second fuel cells to electrically connect the first fuel cell and the second fuel cell to each other;
wherein the first fuel cell and the second fuel cell each comprises (i) a first electrode formed on an interior side of the respective fuel cells through which a first gas flows, (ii) a second electrode of a polarity different from the first electrode, the second electrode being formed on an exterior side of the respective first and second fuel cells along which a second gas flows, (iii) an electrolyte disposed between the first electrode and the second electrode, and (iv) vertically spaced upper and lower first electrode terminals formed on the exterior side of the respective first and second fuel cells in electrical contact with the first electrode of the respective first and second fuel cells, wherein the upper and lower current collectors being attached to the first and second fuel cells each comprise (a) first and second gripping portions vertically offset from each other and horizontally spaced apart from each other at an interval at which the first and second fuel cells are disposed, and (b) a connecting portion electrically connecting the first and second gripping portions to each other, wherein the first and second gripping portions each comprise a pair of holding strips generally horizontally spaced apart to face each other, the holding strips of the pairs all extending from the connecting portion in a direction generally perpendicular to a plane going through both first and second fuel cells, and wherein the first and second gripping portions of the upper current collector each hold one of the first and second fuel cells between its holding strips to conduct electrical current between the second electrode of the first fuel cell and the upper first electrode of the second fuel cell, and the first and second gripping portions of the lower current collector each hold one of the first and second fuel cells between its holding strips to conduct electrical current between the second electrode of the first fuel cell and the lower first electrode of the second fuel cell.

2. The fuel cell assembly according to claim 1, wherein the upper and lower current collectors are attached to the first and second fuel cells at positions vertically equidistant from a longitudinal center of the first and second fuel cells.

3. The fuel cell assembly according to claim 1, wherein the upper and lower current collectors are attached to the first and second fuel cells at end portions thereof furthest from a longitudinal center of the first and second fuel cells.

4. The fuel cell assembly according to claim 3, wherein the connecting portions of the upper and lower current collectors are each vertically angled to connect the vertically offset first and second gripping portions.

5. The fuel cell assembly according to claim 4, wherein the connecting portions of the upper and lower current collectors extend between the first and second fuel cells in parallel with a plane going through longitudinal axes of the first and second fuel cells.

6. The fuel cell assembly according to claim 3, wherein the upper and lower current collectors each comprise a crimping surface portion for vertically crimping one of the upper and lower first electrode terminals at longitudinal ends of the second fuel cell.

7. The fuel cell assembly according to claim 6, wherein the crimping surface portions of the upper and lower current collectors each comprise a variation absorbing portion for absorbing variations in vertical location of the second fuel cell.

8. The fuel cell assembly according to claim 6, wherein the second fuel cell comprises a cylindrical part at both end portions thereof electrically connected to the upper and lower first electrode terminals of the second fuel cell, and the crimping surface portions of the upper and lower current collectors are each formed with a notch for receiving one of the cylindrical parts.

9. The fuel cell assembly according to claim 3, wherein the first and second fuel cells each comprise a porous, electrically conductive current collector film provided over the second electrode of the respective first and second fuel cells, and the upper and lower current collectors are attached to the first and second fuel cells to electrically connect to the current collector films.

10. A fuel cell device provided with the fuel cell assembly according to claim 1.

* * * * *